(12) United States Patent
Park et al.

(10) Patent No.: US 11,320,173 B2
(45) Date of Patent: May 3, 2022

(54) SMOKE TUBE BOILER

(71) Applicant: KYUNGDONG NAVIEN CO., LTD., Pyeongtaek-si (KR)

(72) Inventors: Jun Kyu Park, Seoul (KR); Duck Sik Park, Seoul (KR); Jung Woo Kim, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 346 days.

(21) Appl. No.: 16/461,605

(22) PCT Filed: Dec. 29, 2017

(86) PCT No.: PCT/KR2017/015756
§ 371 (c)(1),
(2) Date: May 16, 2019

(87) PCT Pub. No.: WO2018/124824
PCT Pub. Date: Jul. 5, 2018

(65) Prior Publication Data
US 2020/0064024 A1    Feb. 27, 2020

(30) Foreign Application Priority Data

Dec. 30, 2016  (KR) .................. 10-2016-0183976
Dec. 30, 2016  (KR) .................. 10-2016-0184243
Dec. 30, 2016  (KR) .................. 10-2016-0184248
Dec. 29, 2017  (KR) .................. 10-2017-0183571

(51) Int. Cl.
*F24H 9/20*    (2022.01)
*F23D 14/02*   (2006.01)
(Continued)

(52) U.S. Cl.
CPC ........... *F24H 9/2035* (2013.01); *F23D 14/02* (2013.01); *F23D 14/62* (2013.01); *F23D 14/78* (2013.01);
(Continued)

(58) Field of Classification Search
CPC ........ F24H 9/2035; F24H 9/0005; F24H 9/02; F24H 9/06; F24H 9/14; F24H 9/18
See application file for complete search history.

(56) References Cited

U.S. PATENT DOCUMENTS 2,544,299 A * 3/1951 Damon ..................... F23D 5/00
                                                       431/260
4,344,479 A * 8/1982 Bailey ...................... F22B 7/00
                                                       165/109.1
(Continued)

FOREIGN PATENT DOCUMENTS

EP       0499557 A1 *  8/1992  ............... F24H 1/32
JP     H 05-088544 U   12/1993
(Continued)

*Primary Examiner* — Nathaniel Herzfeld
(74) *Attorney, Agent, or Firm* — Stein IP, LLC

(57) ABSTRACT

The purpose of the present invention is to provide a smoke tube boiler which can prevent leakage of mixed gas and exhaust gas through a gap between a mix chamber and an ignition bar assembly. To this end, the smoke tube boiler according to the present invention comprises: a mix chamber having a mixing space, in which a combustion gas and air are mixed, and a flat plate type burner, the mix chamber being disposed on the upper side of a combustion chamber; an ignition bar assembly assembled to pass through one side of the mix chamber and extending across the upper portion of the combustion chamber to the lower side of the flat plate type burner; and a sealing means for preventing the mixed gas in the mixing space and an exhaust gas in the combustion chamber from leaking to the outside through a gap between the mix chamber and the ignition bar assembly.

28 Claims, 37 Drawing Sheets

(51) Int. Cl.
  *F23D 14/62* (2006.01)
  *F23D 14/78* (2006.01)
  *F24H 1/36* (2022.01)
  *F24H 8/00* (2022.01)
  *F24H 9/02* (2006.01)
  *F24H 9/06* (2006.01)
  *F24H 9/14* (2006.01)
  *F24H 9/18* (2022.01)
  *F24H 9/00* (2022.01)

(52) U.S. Cl.
  CPC .............. *F24H 1/36* (2013.01); *F24H 8/006* (2013.01); *F24H 9/0005* (2013.01); *F24H 9/02* (2013.01); *F24H 9/06* (2013.01); *F24H 9/14* (2013.01); *F24H 9/18* (2013.01)

(56) References Cited

U.S. PATENT DOCUMENTS

| | | | | |
|---|---|---|---|---|
| 4,737,102 | A * | 4/1988 | Jinno | F23C 5/02 122/18.4 |
| 4,752,213 | A * | 6/1988 | Grochowski | F23D 14/02 431/328 |
| 5,393,224 | A * | 2/1995 | Allen | F23Q 3/008 431/263 |
| 5,775,268 | A * | 7/1998 | Ferguson | F24H 1/36 122/18.31 |
| 5,997,278 | A * | 12/1999 | Sutton | F23N 3/082 431/12 |
| 8,656,867 | B2 * | 2/2014 | Deivasigamani | F24H 1/186 122/249 |
| 2012/0080172 | A1 * | 4/2012 | Pacholski | F24H 9/0015 165/157 |
| 2014/0373794 | A1 * | 12/2014 | Choi | F24H 1/18 122/18.1 |

FOREIGN PATENT DOCUMENTS

| | | |
|---|---|---|
| KR | 10-2005-0036152 A | 4/2005 |
| KR | 10-0581580 B1 | 5/2006 |
| KR | 10-1434978 B1 | 8/2014 |

* cited by examiner

[FIG. 1]

PRIOR ART

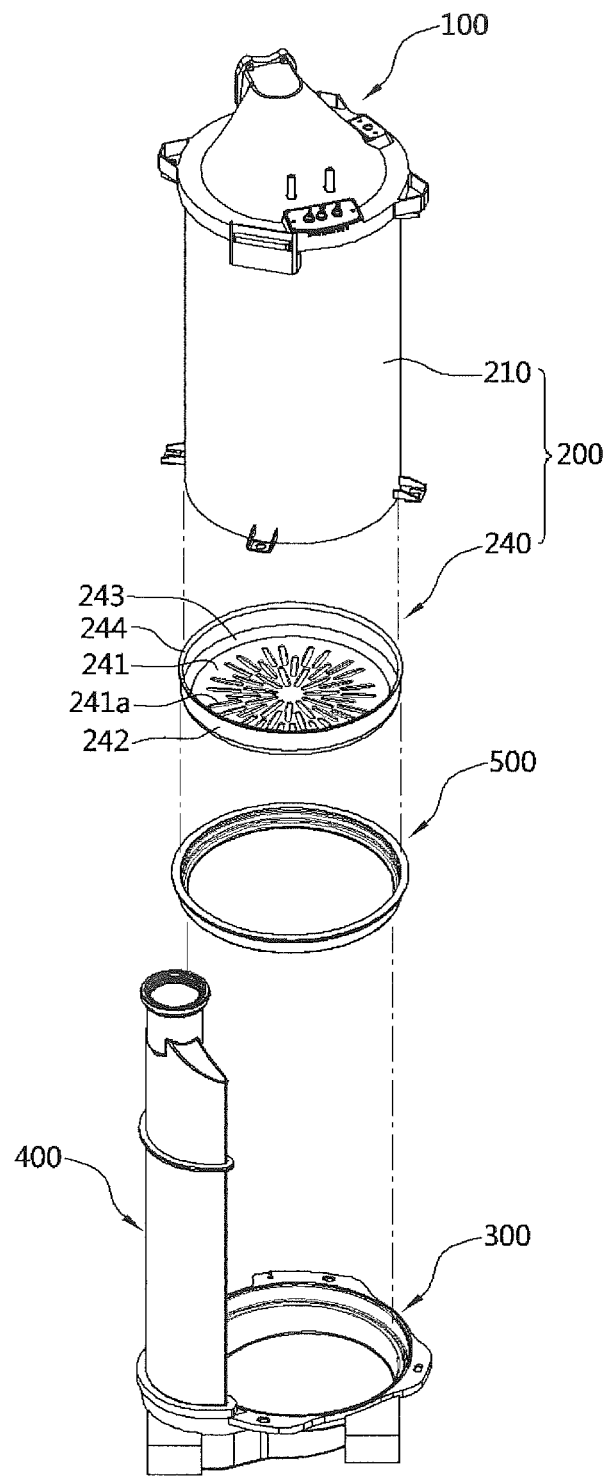
[FIG. 10]

[FIG. 11A]
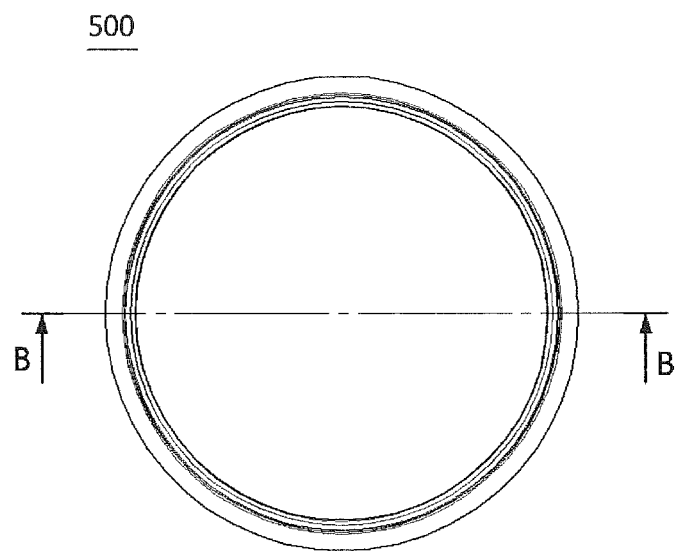
[FIG. 11B]
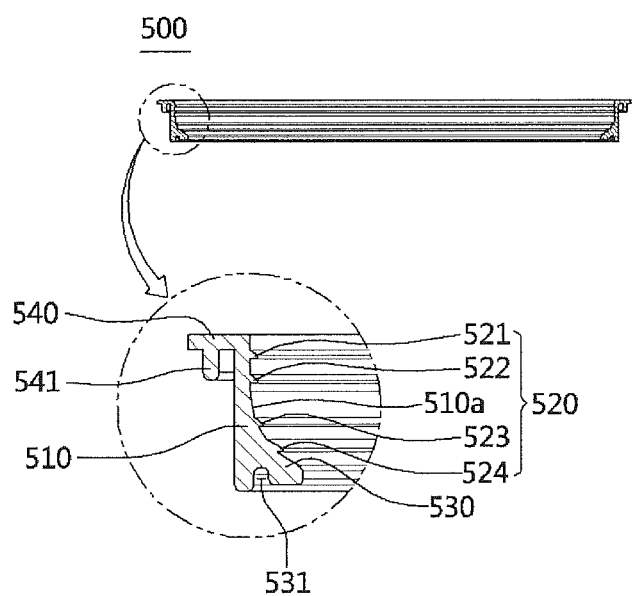

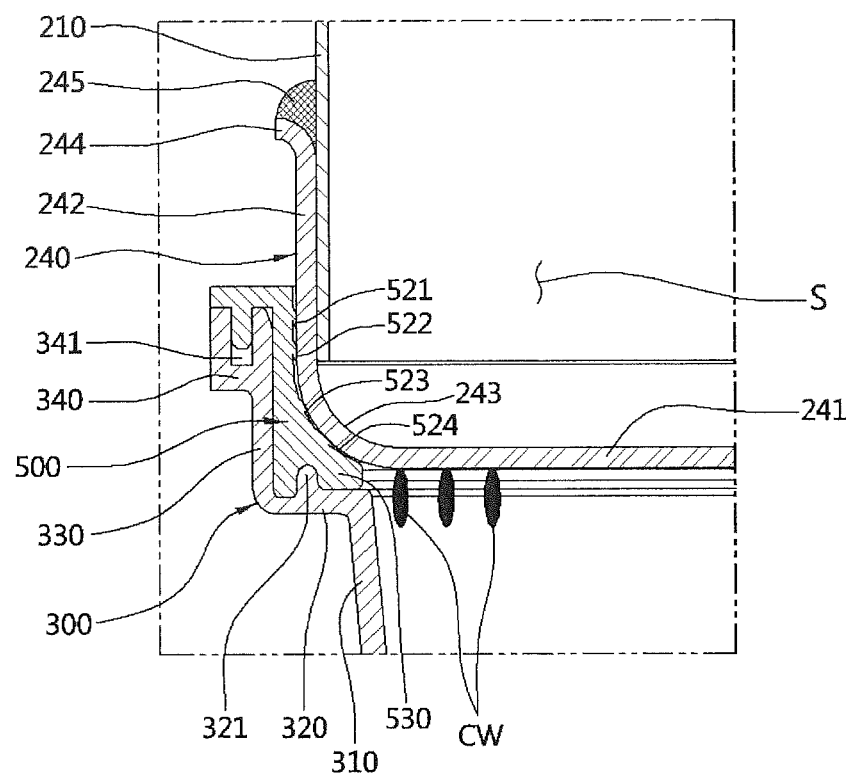
[FIG. 12]

[FIG. 13]
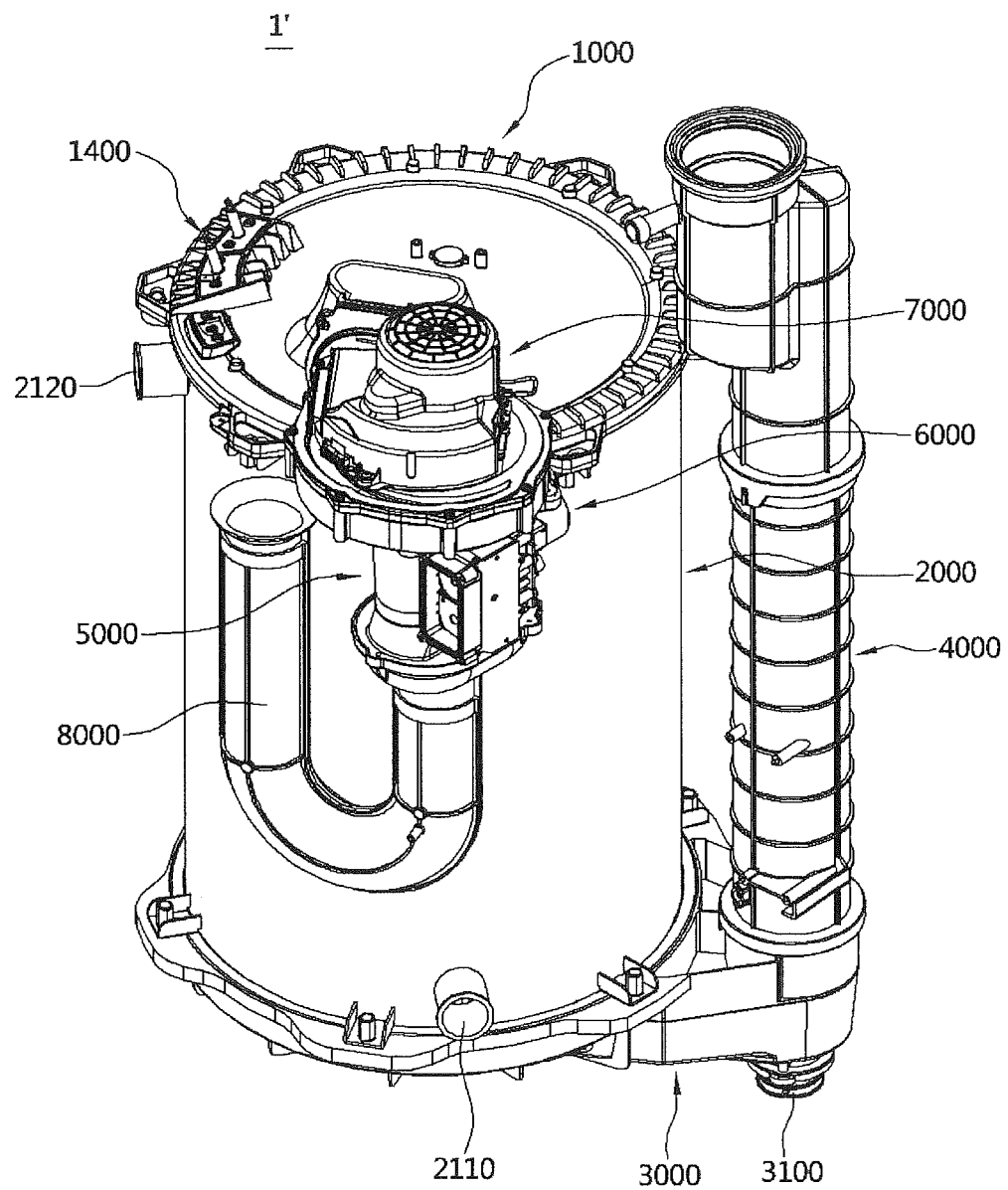

[FIG. 14]
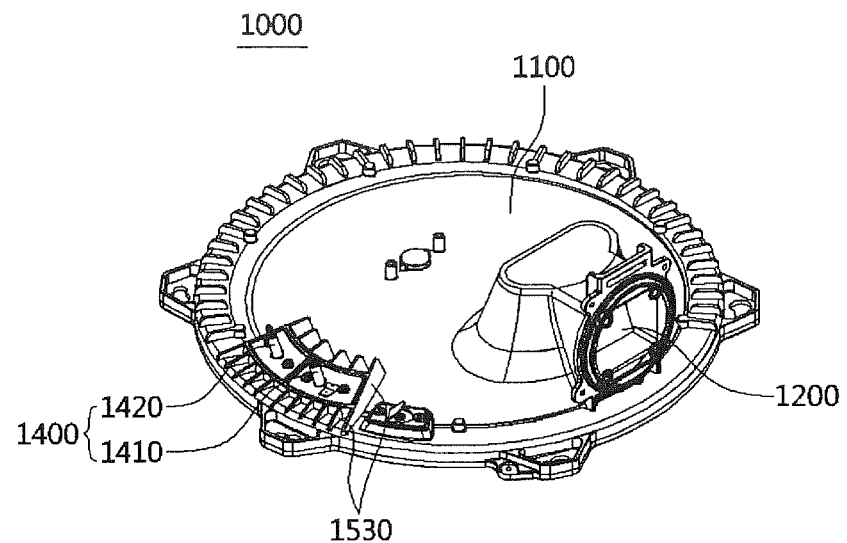
[FIG. 15]
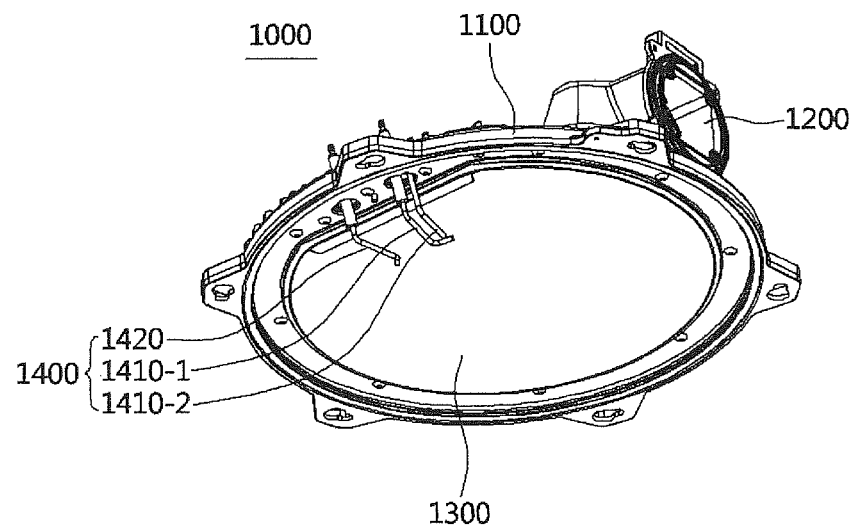

[FIG. 16]
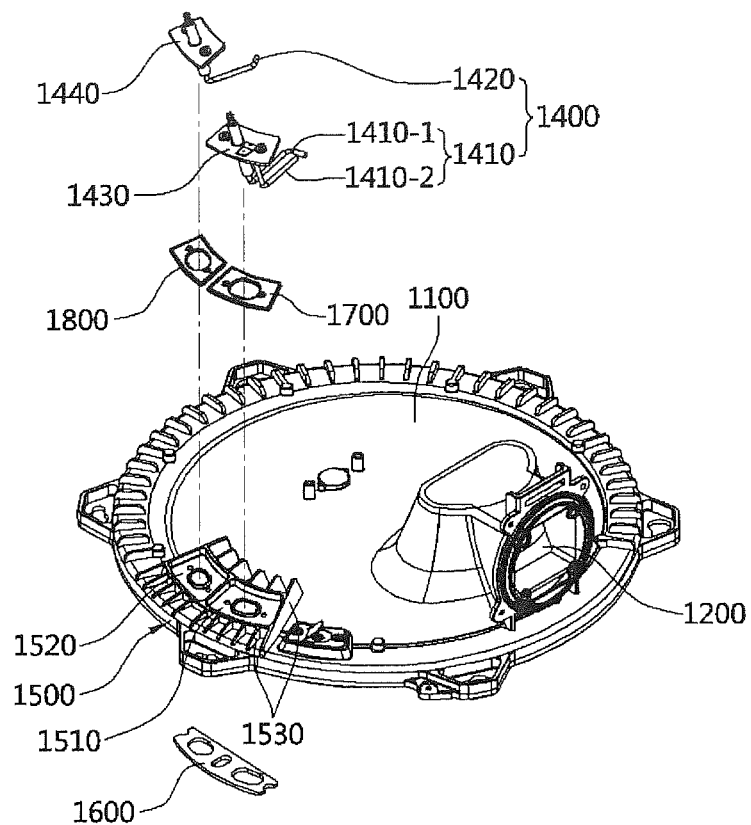

[FIG. 17]
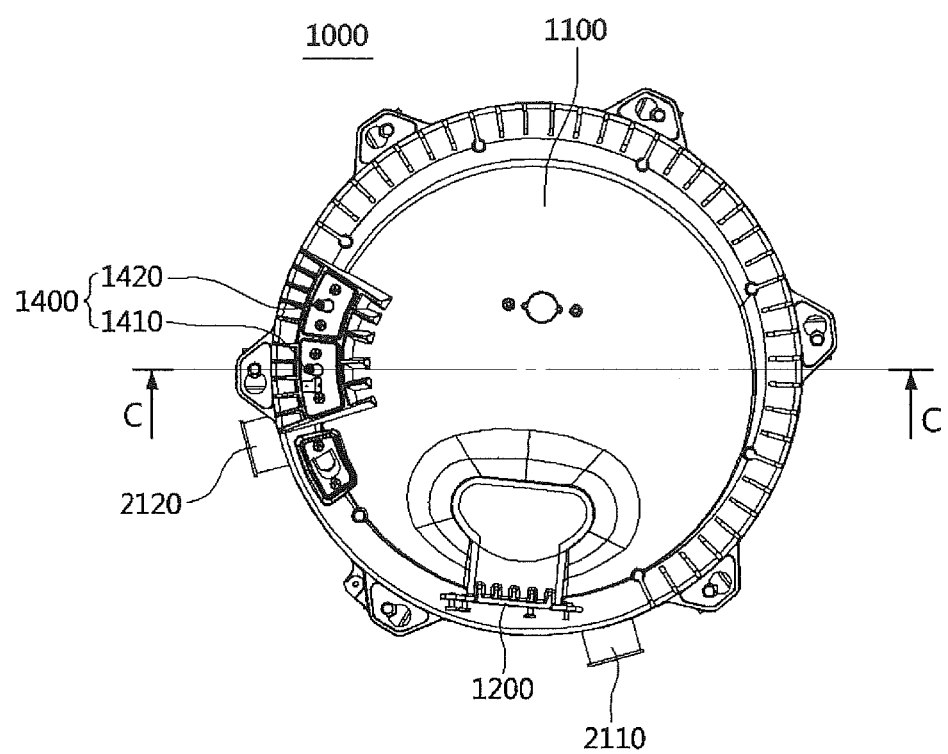

[FIG. 18]
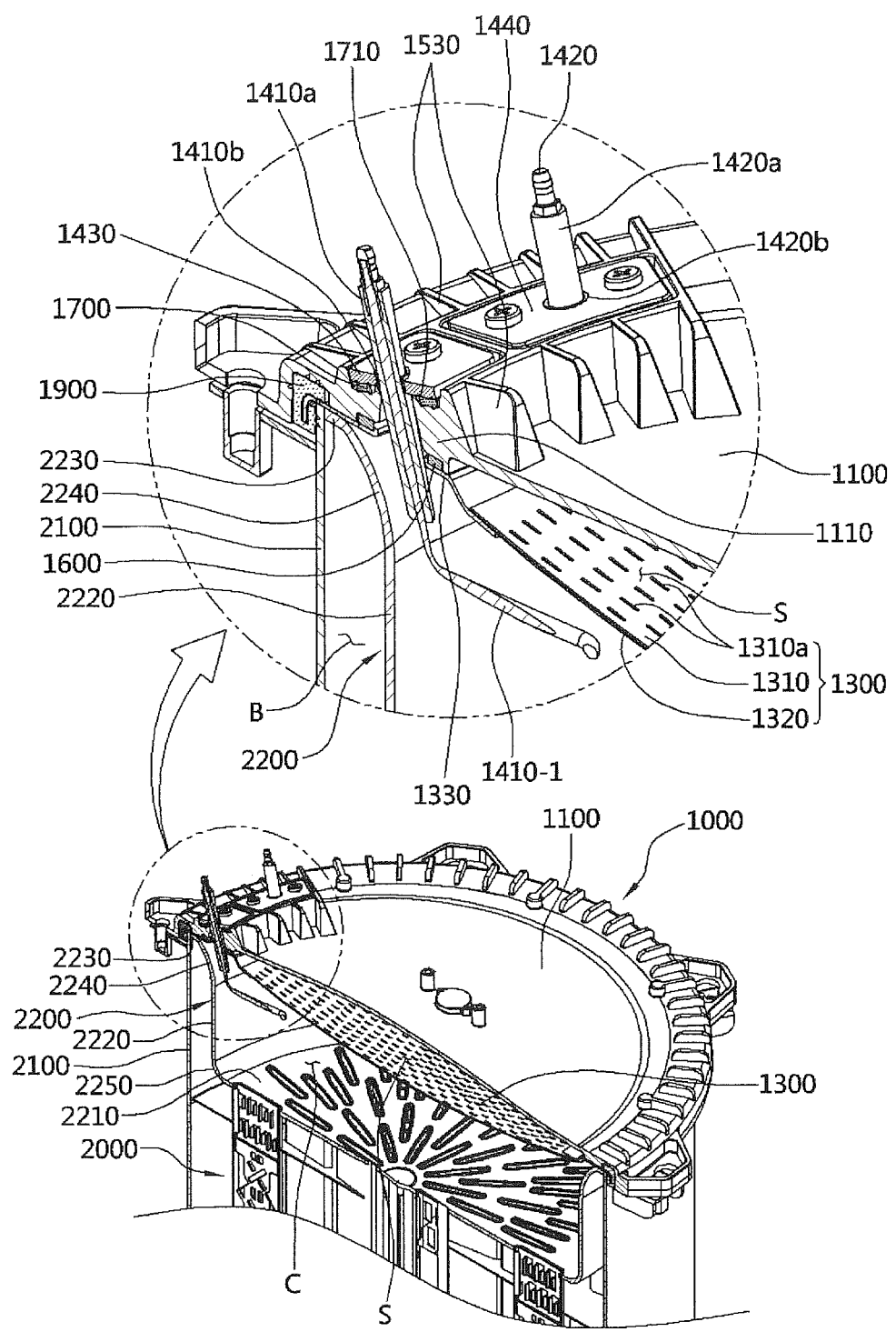

[FIG. 19]
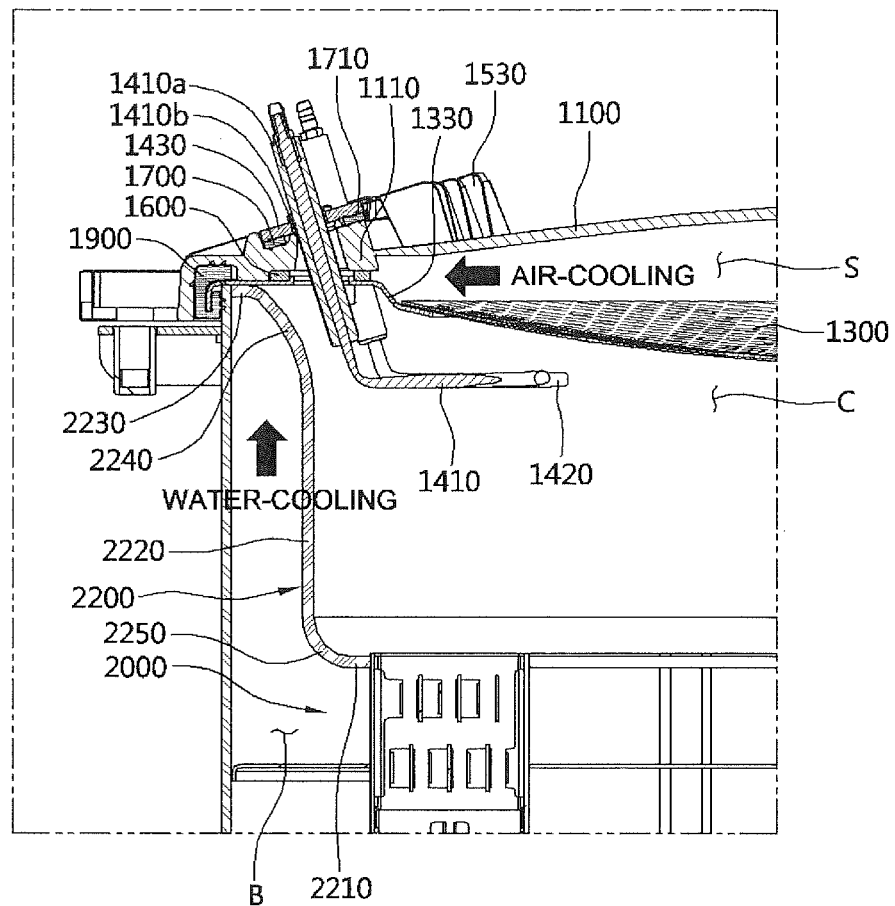
[FIG. 20]
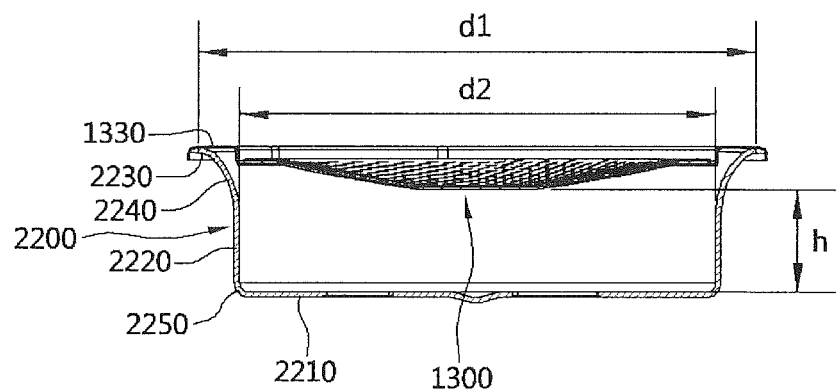

[FIG. 21]
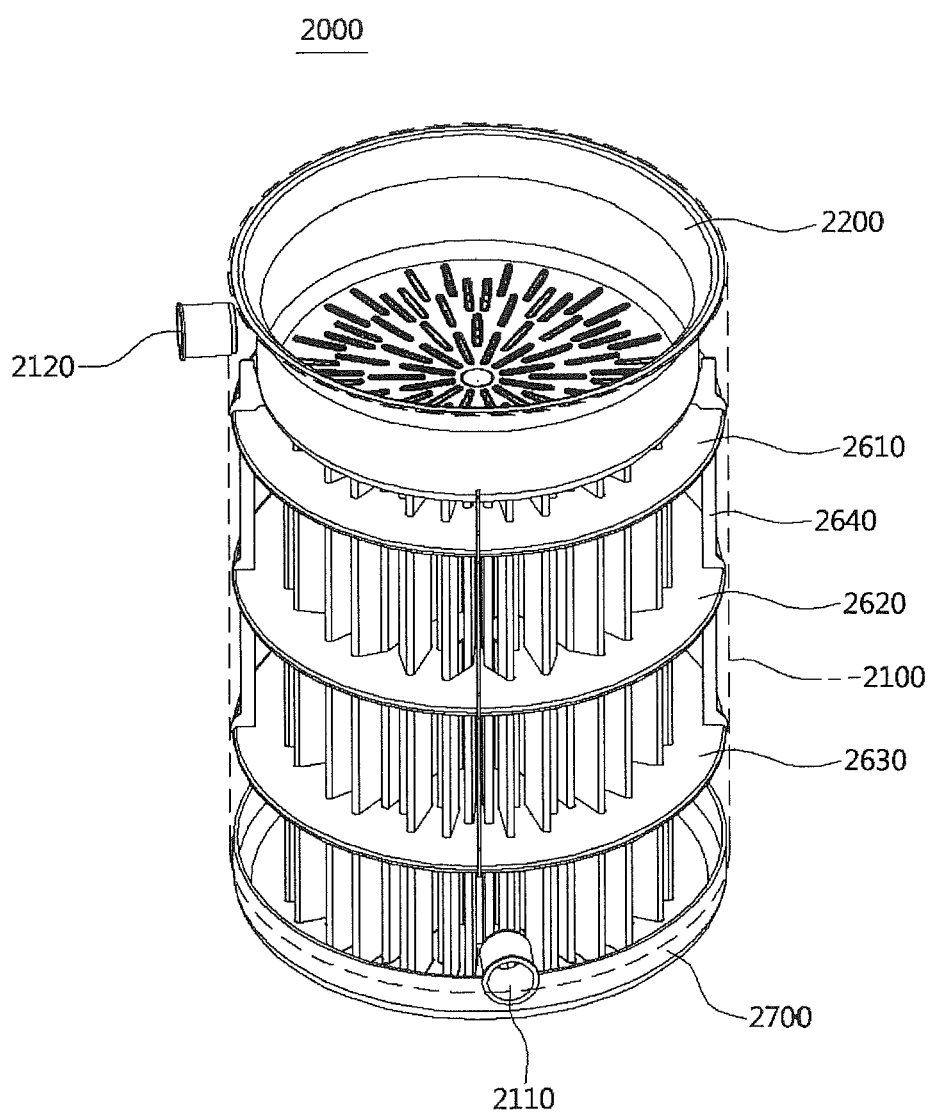

[FIG. 22]
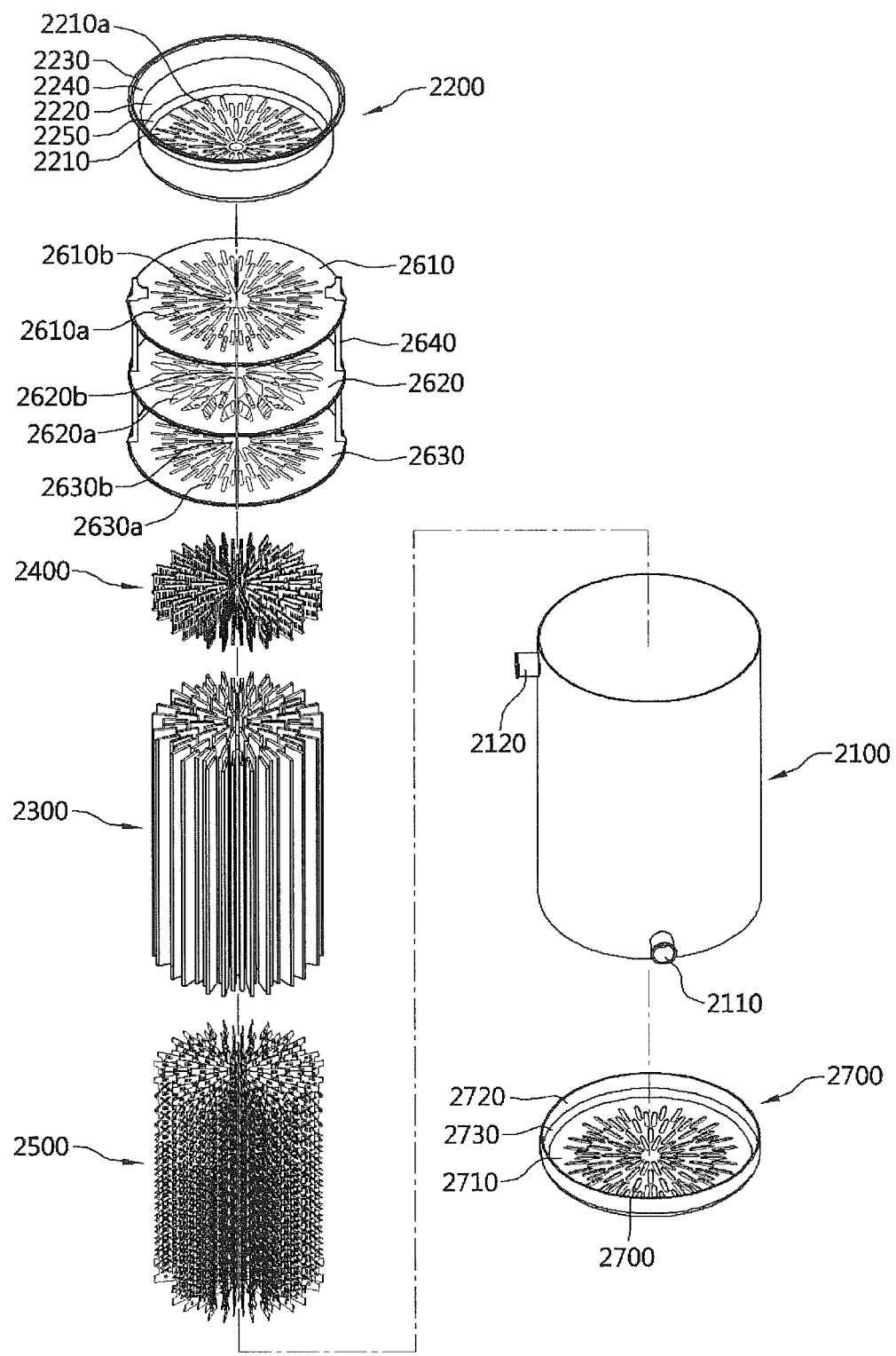

[FIG. 23]
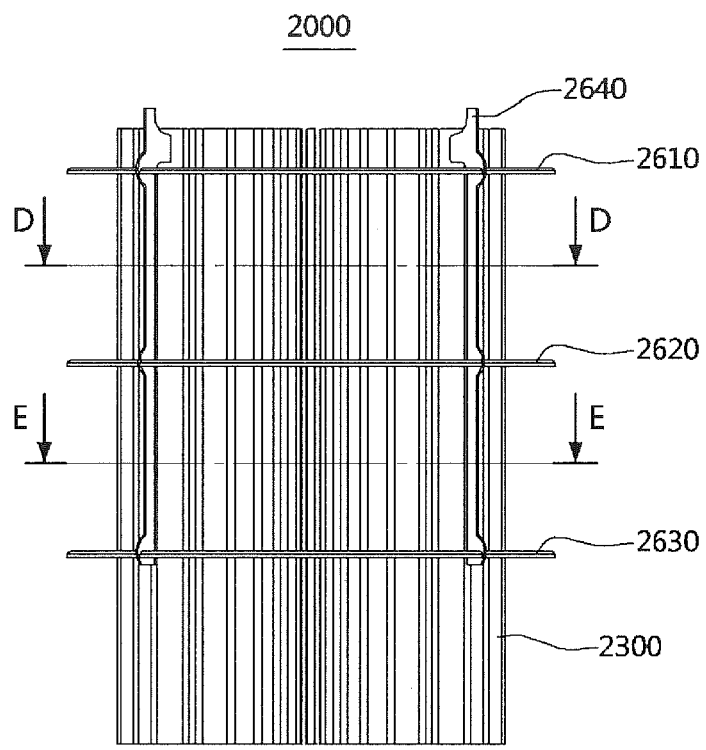
[FIG. 24A]
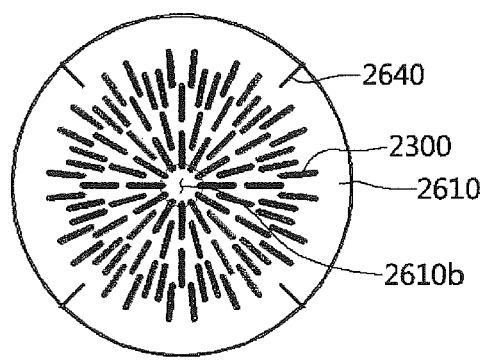

[FIG. 24B]
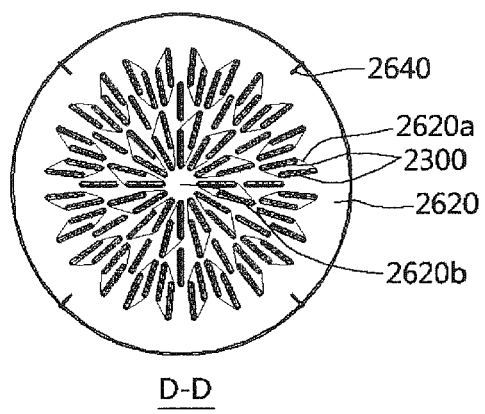
D-D
[FIG. 24C]
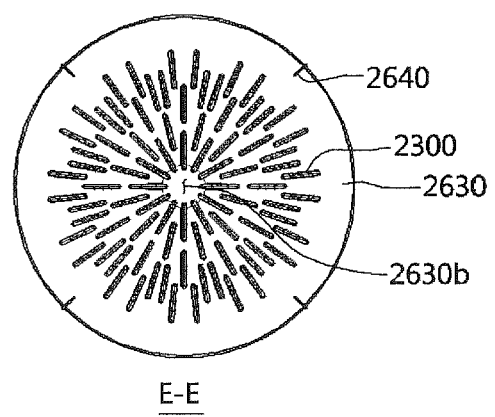
E-E

[FIG. 25]
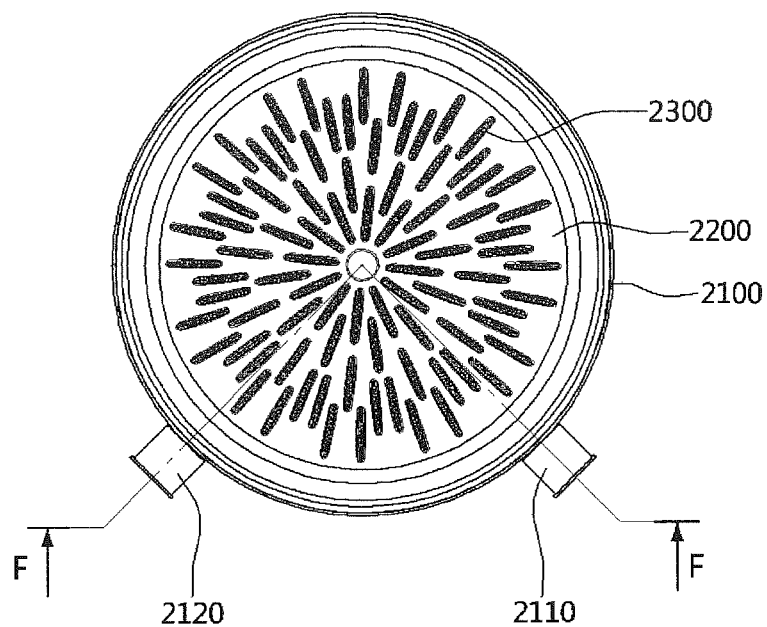

[FIG. 26]
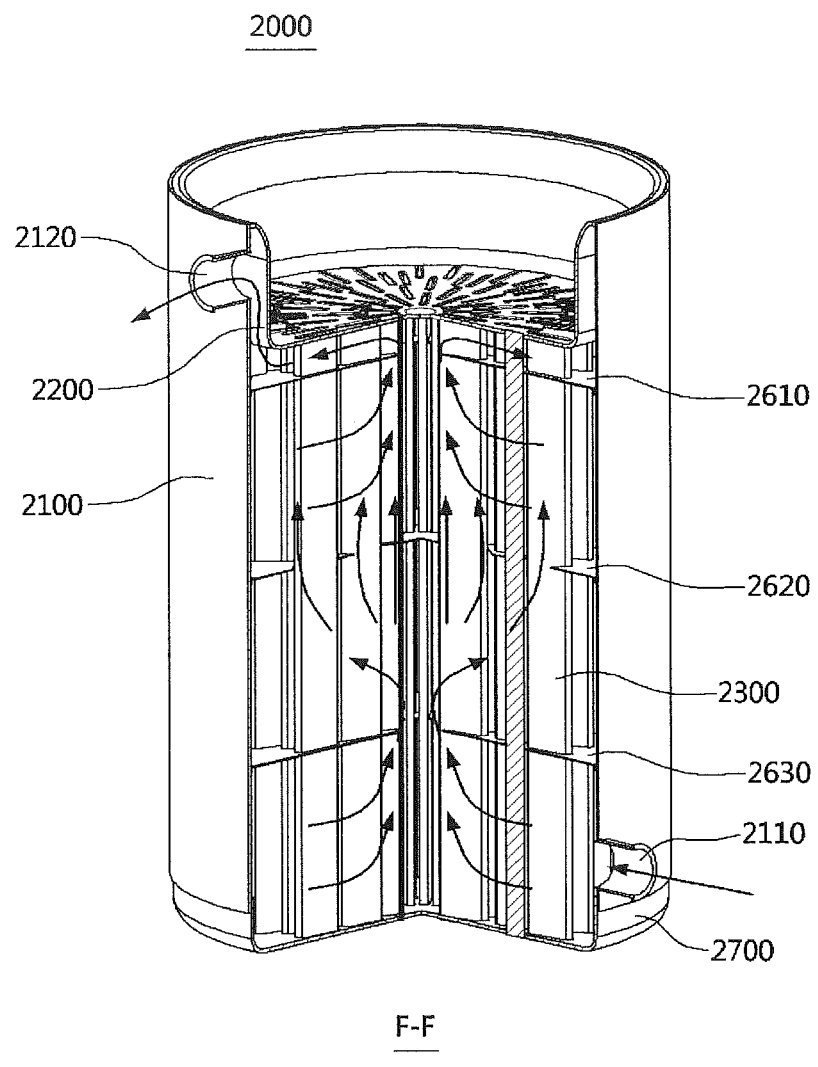
F-F

[FIG. 27]
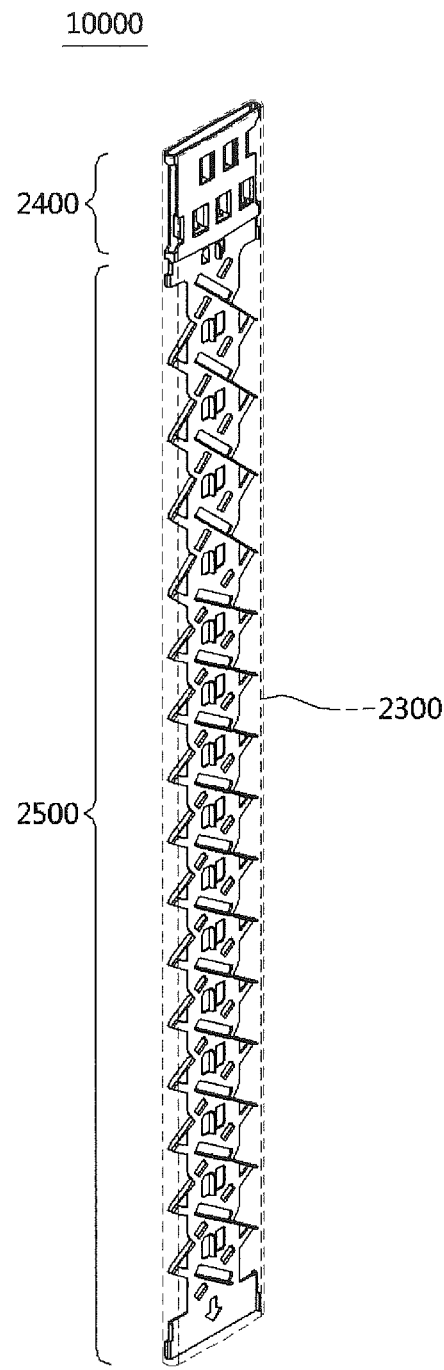

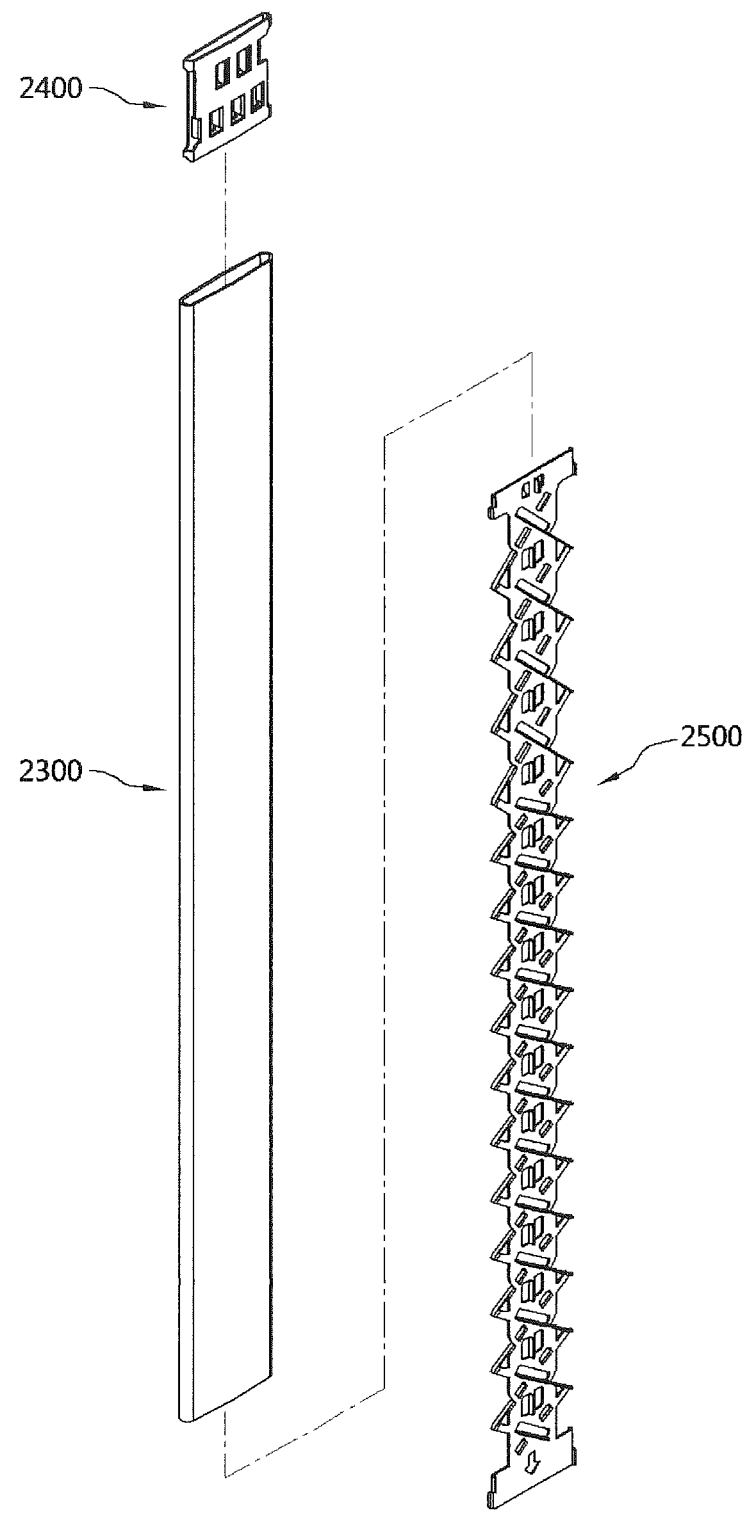
[FIG. 28]

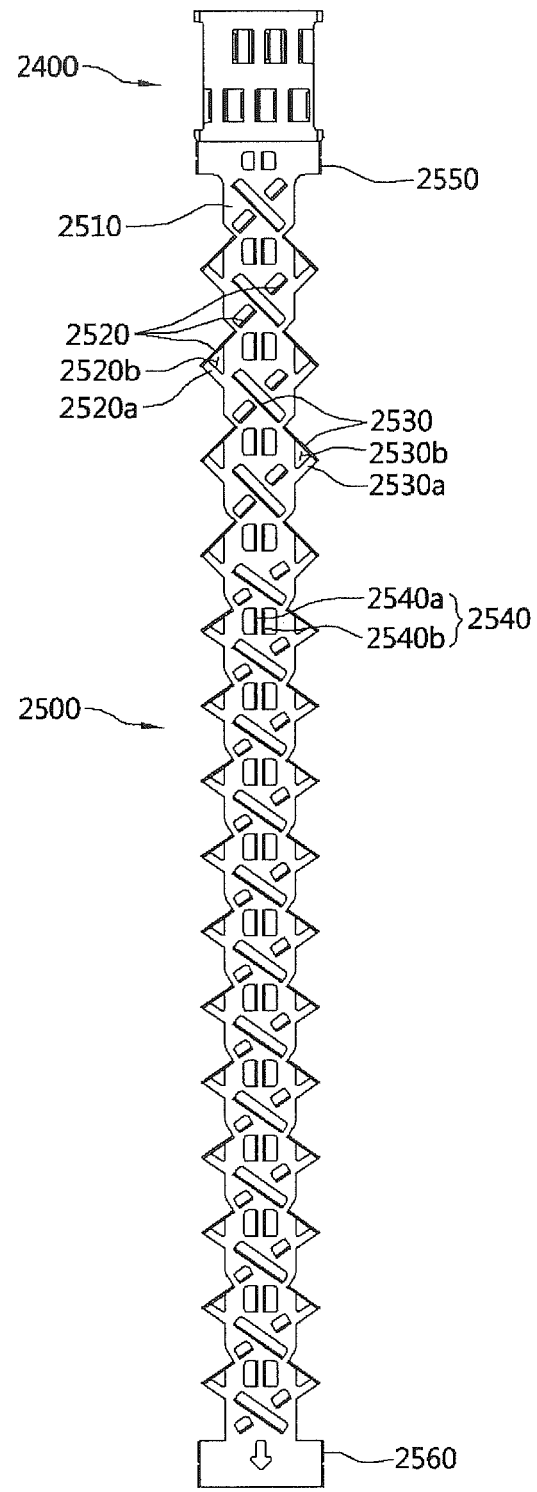
[FIG. 29]

[FIG. 30]
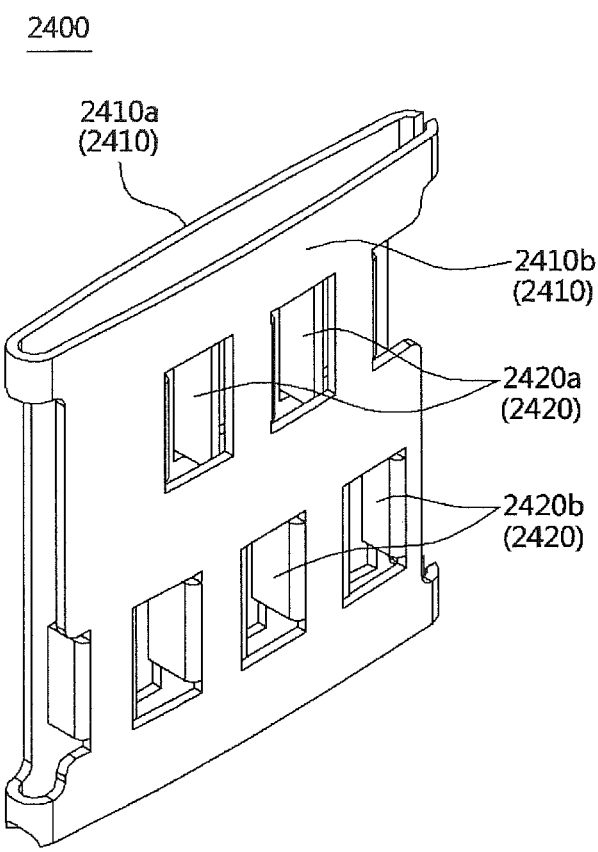

[FIG. 31]
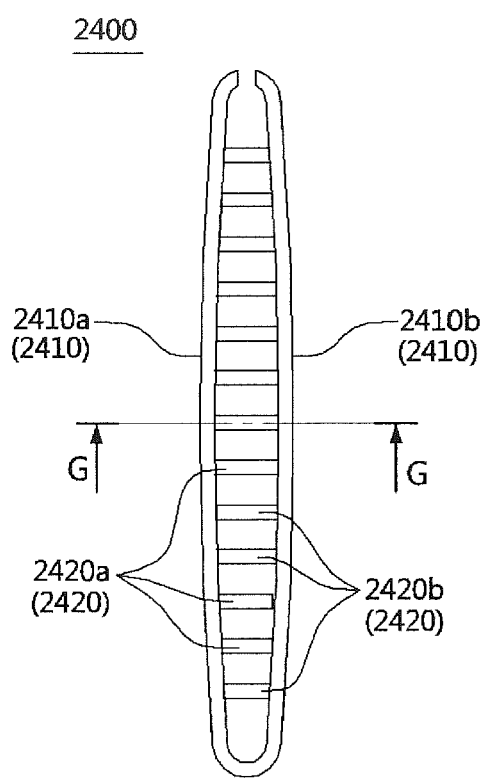

[FIG. 32A]
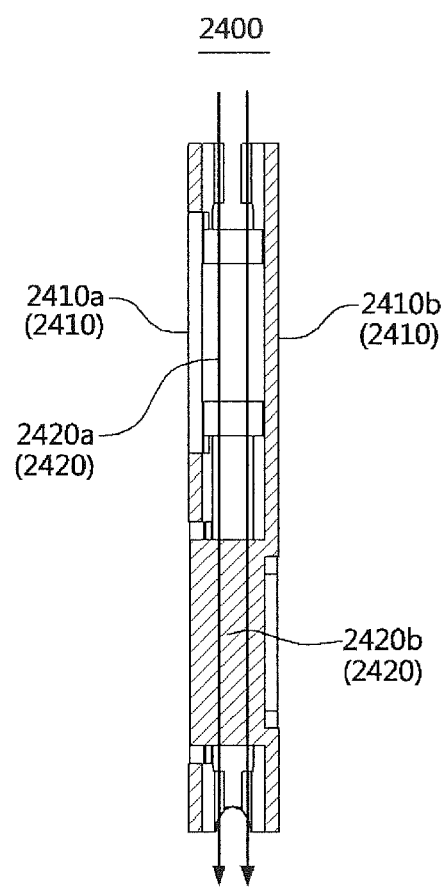

[FIG. 32B]
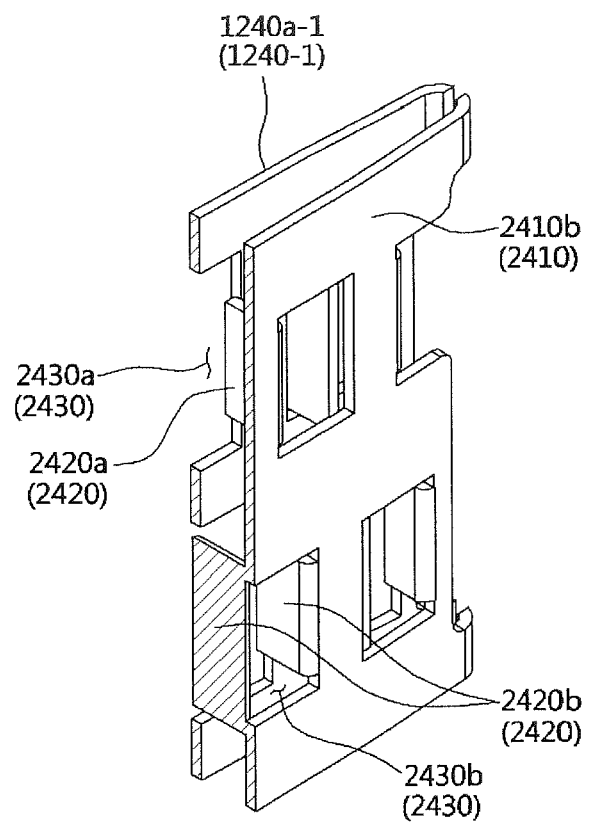

[FIG. 33]
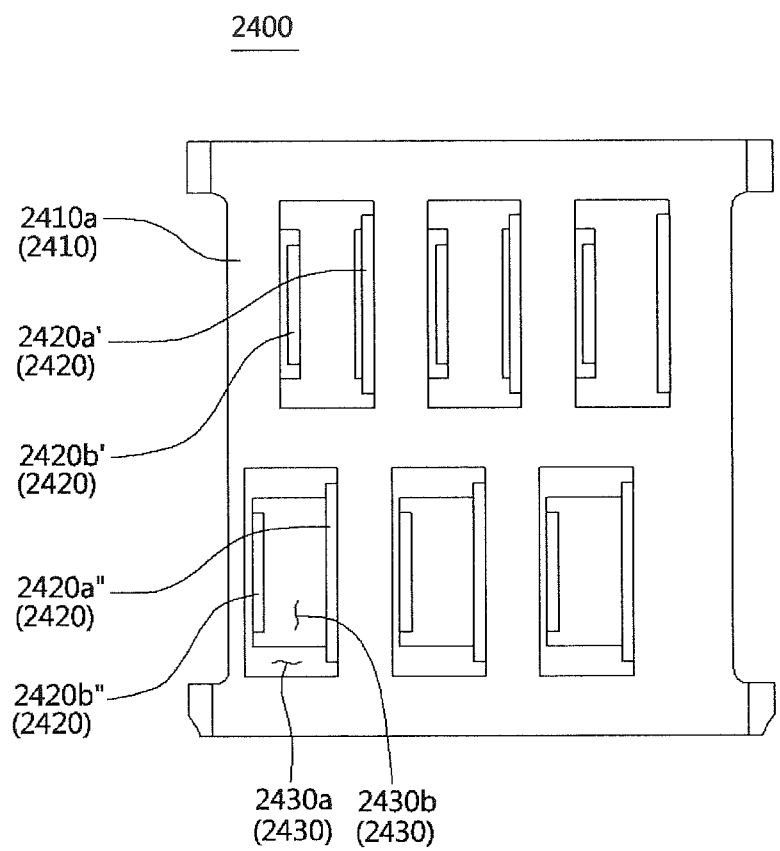

[FIG. 34]
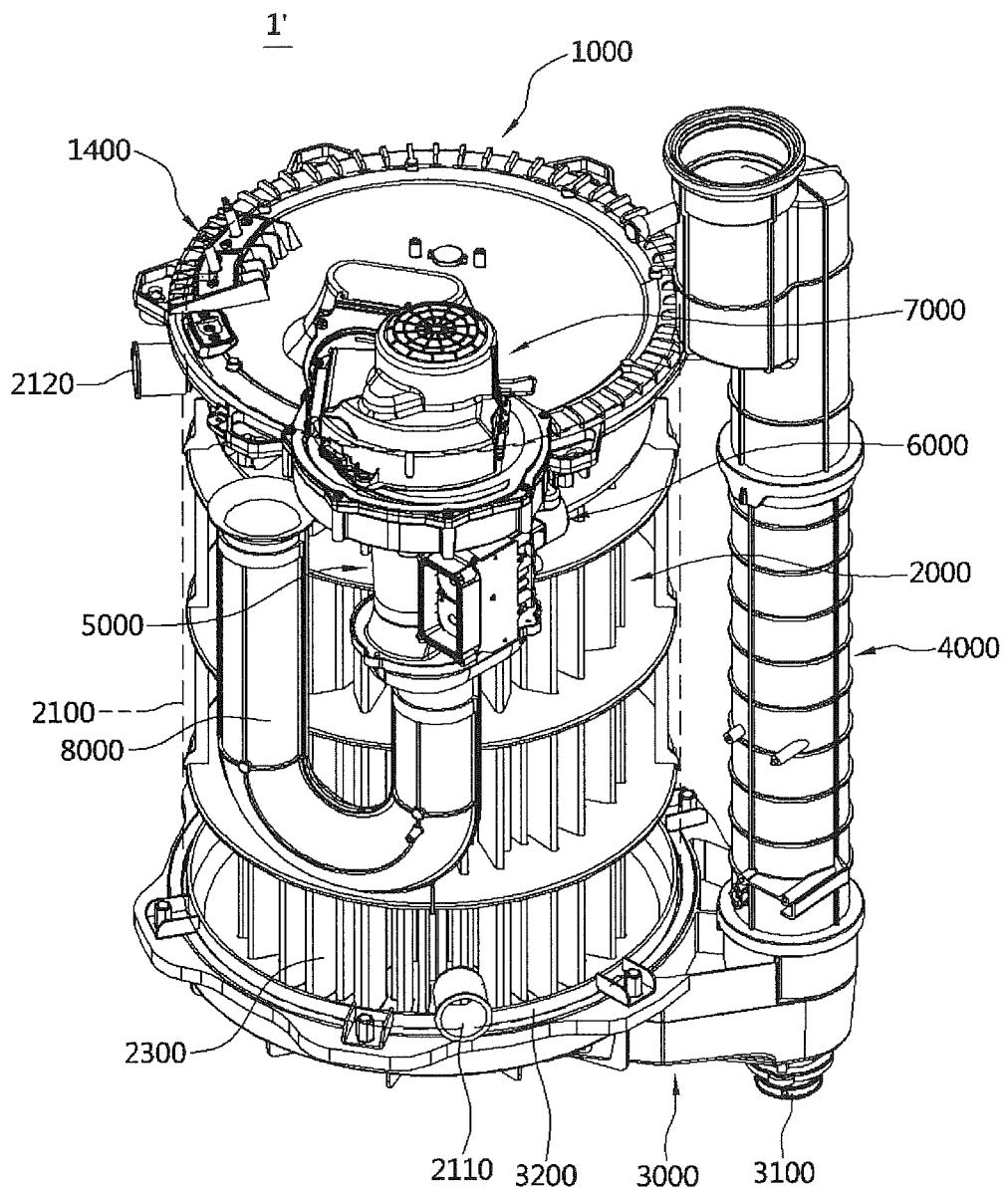

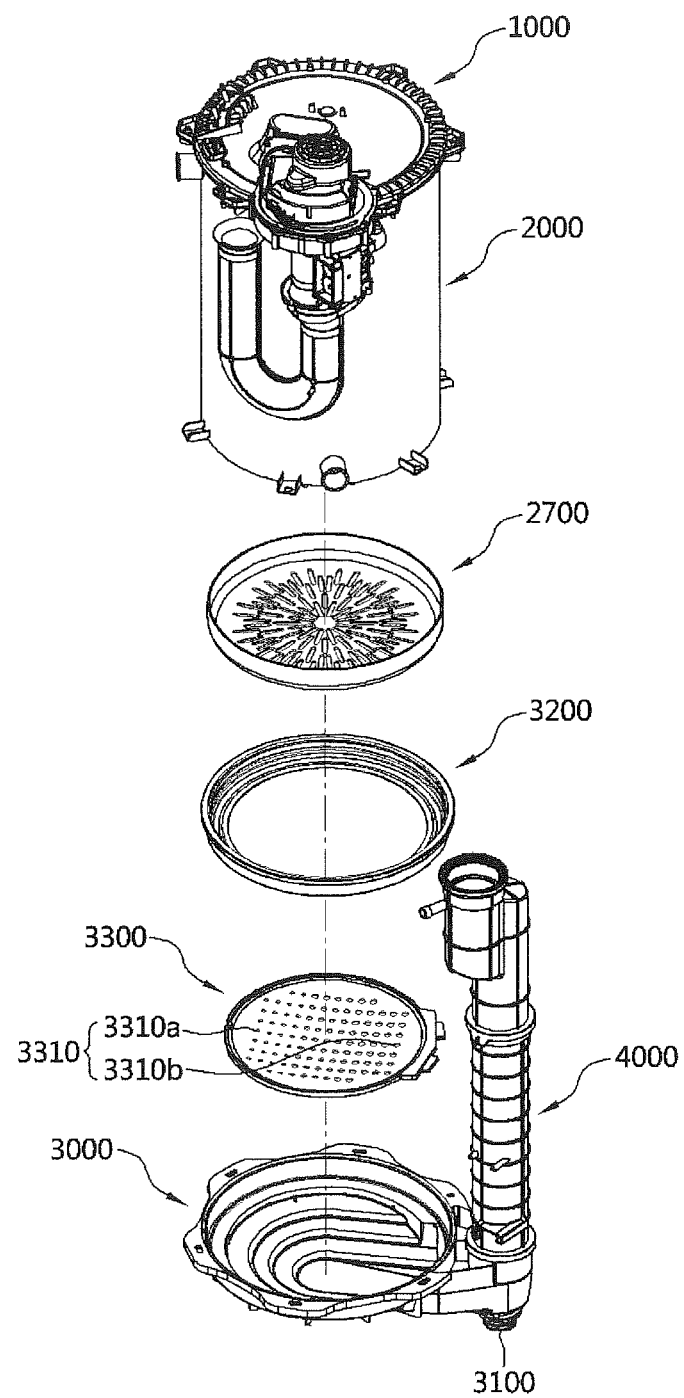
[FIG. 35]

[FIG. 36A]
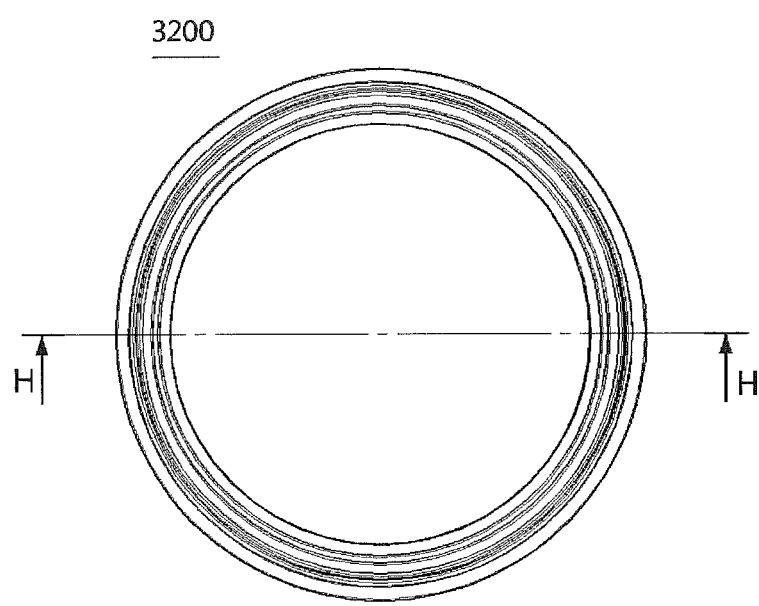

[FIG. 36B]
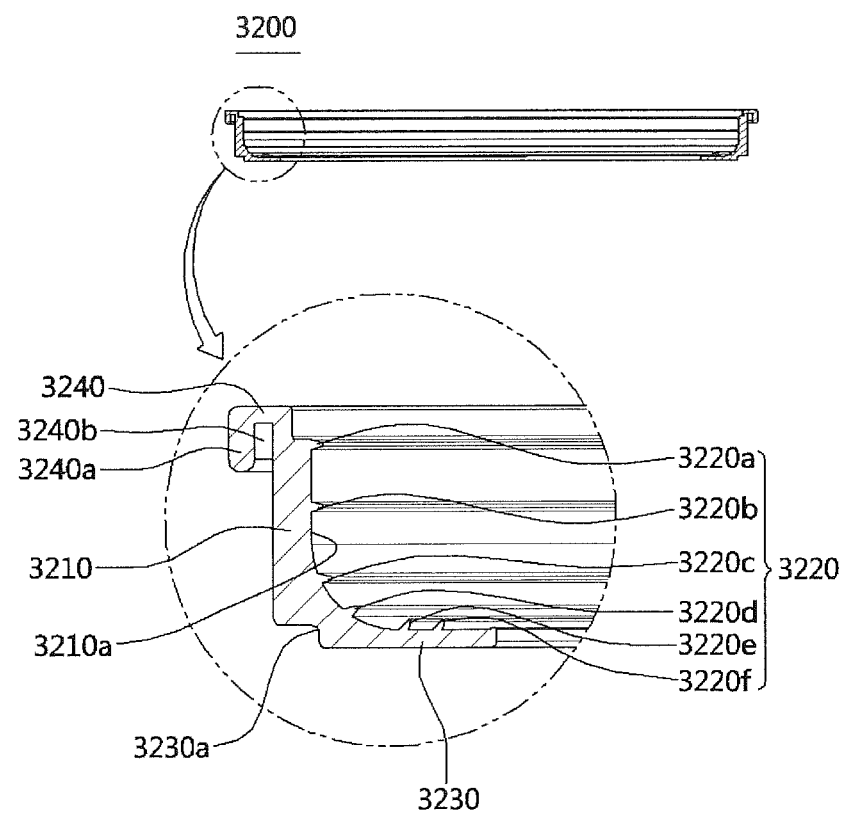

[FIG. 37]
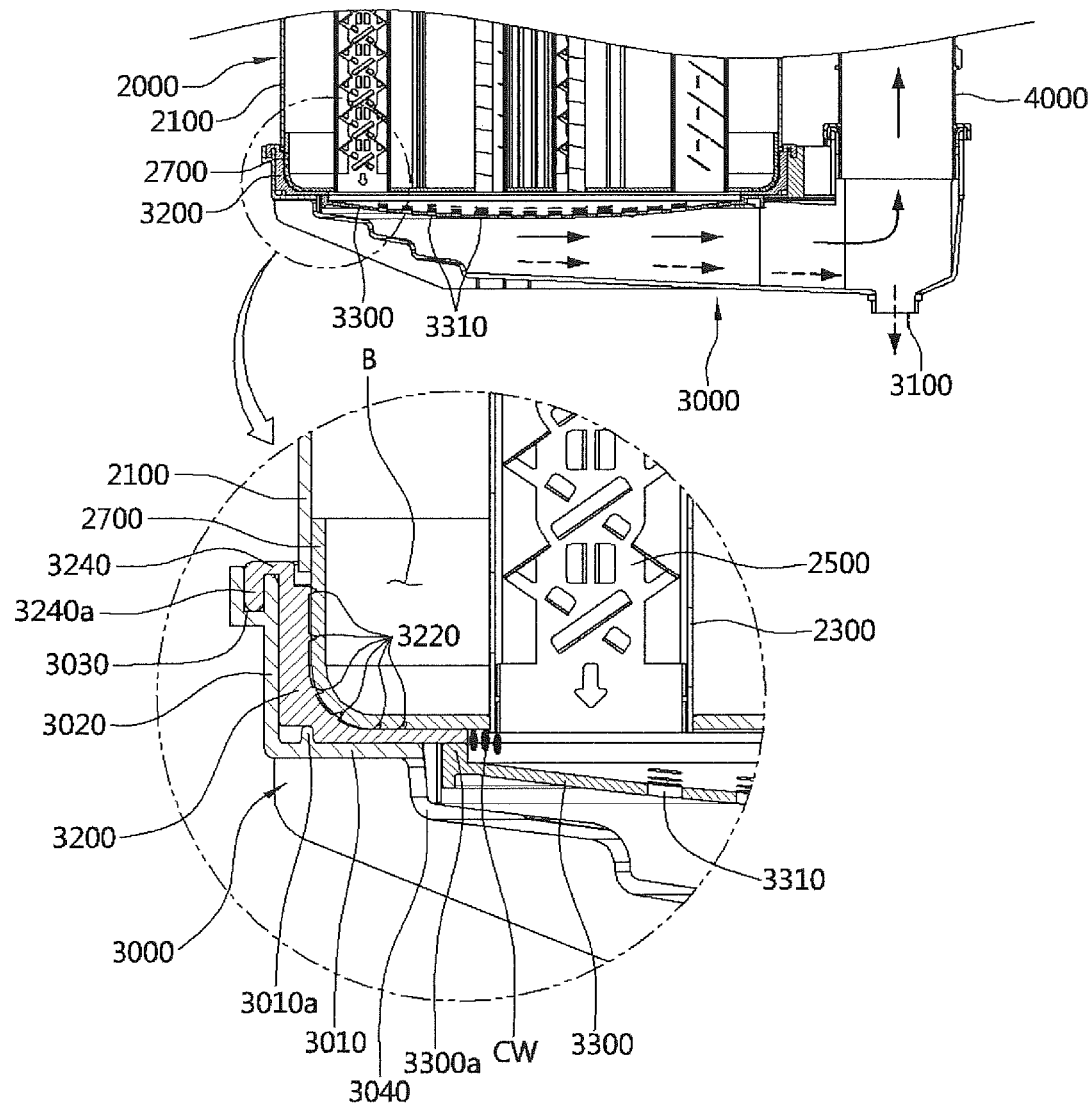

SMOKE TUBE BOILER

CROSS-REFERENCE TO RELATED APPLICATIONS

This application is a national stage of International Application No. PCT/KR2017/015756, filed Dec. 29, 2017 which claims the benefit of priority to Korean Application No. 10-2016-0184248 filed Dec. 30, 2016, Korean Application No. 10-2016-0184243 filed Dec. 30, 2016, Korean Application No. 10-2016-0183976 filed Dec. 30, 2016, and Korean Application No. 10-2017-0183571 filed Dec. 29, 2017, in the Korean Intellectual Property Office, the disclosures of which is incorporated herein by reference.

TECHNICAL FIELD

The present invention relates to a smoke tube boiler, and more specifically, to a smoke tube boiler having a structure which can prevent leakage of a mixed gas and an exhaust gas, thermal damage of an ignition bar assembly, and corrosion due to stagnation of condensate, and reliably block leakage of the condensate, in coupling the ignition bar assembly through one side portion of a mix chamber including a flat plate type burner.

BACKGROUND ART

Generally, a boiler includes a heat exchanger in which heat exchange between a combustion gas by the combustion of fuel and a heat medium is performed to perform heating or supply warm water using the heated heat medium. Such a boiler can include a heat exchanging part in which the heat exchanger is provided, a burner assembled on the heat exchanging part, and a combustion chamber provided between the burner and the heat exchanger and into which a combustion gas and air are supplied to perform combustion.

FIG. 1 is a view schematically illustrating a configuration of a conventional smoke tube boiler.

The conventional smoke tube boiler includes a blower 10 configured to supply a combustion gas and air, a cylindrical burner 20 configured to combust a mixed air of the combustion gas and the air, a combustion chamber 30 in which the mixed air is combusted by the burner 20, a heat exchanger 40 in which heat exchange between the combustion gas generated from the combustion chamber 30 and a heat medium is performed, an insulation material 50 configured to prevent the transfer of heat generated from the combustion chamber 30 to an upper side near the cylindrical burner 20, and an ignition bar 60 installed through the insulation material 50 and configured to ignite the mixed air.

The heat exchanger 40 can include an outer cylinder 41, a plurality of tubes 42 provided therein and through which the combustion gas generated from the combustion chamber 30 passes, and a water tank 43 in which the heat medium is accommodated outside of the tubes 42.

According to the configuration of the conventional smoke tube boiler, since the cylindrical burner 20 is provided having a vertically long shape, the overall height of the boiler is greatly increased such that the boiler cannot be compactly manufactured. Accordingly, there is a problem that an installation space is limited.

Further, in the conventional smoke tube boiler, when the ignition bar 60 is installed through a combustion chamber cover 12 installed between the blower 10 and the cylindrical burner 20, the insulation material 50 is applied to prevent thermal conduction to the ignition bar 60.

However, the insulation material 50 is cracked due to heat during combustion or broken into small grain shapes to cause problems such as blocking the tubes 42 which are paths for the combustion gas of the heat exchanger 40, and when the combustion chamber cover 12 and a mix chamber 11 including the cylindrical burner 20 are disassembled for maintenance, damage to the insulation material 50 is inevitable.

Meanwhile, when the ignition bar 60 is installed at the heat exchanger 40, the manufacturing process is increased due to the addition of unnecessary processes and components, and there is a risk of leakage of the heat medium.

As described above, a prior art related to a structure for assembling the ignition bar on the combustion chamber cover is disclosed in Registered Patent No. 10-0575187 and Registered Patent No. 10-0581580.

Further, when a flat plate type burner having greater combustion performance in comparison with the cylindrical burner 20 is applied, a heat exchanger is coupled to one side of a mix chamber to which the flat plate type burner is coupled and a combustion chamber is formed between the mix chamber and the heat exchanger. In this case, when an ignition bar assembly is coupled to the mix chamber by passing through one side portion, an unburned mixed gas can leak to the outside through a gap between the mix chamber and the ignition bar assembly. When such a unburned mixed gas (raw gas) leaks to the outside, there is a problem that it brings about a lethal threat to the human body.

When a sealing member configured to prevent leakage of the above-described mixed gas is installed, since high-temperature heat from the combustion chamber is transferred to the sealing member and thus the sealing member can be easily broken due to deterioration, there is a problem that it is difficult to install the sealing member while preventing breakage due to the deterioration.

Meanwhile, in a smoke tube heat exchanger disclosed in European Laid-Open Patent EP 2508834 and European Laid-Open Patent EP 2437022, an outer cylinder for providing a water tank in which a heat medium is accommodated is provided at the outside of a tube. An upper plate forming an upper surface of the water tank and supporting an upper end portion of the outer cylinder is coupled to an upper end portion of the tube and a lower plate forming a bottom surface of the water tank and supporting a lower end portion of the outer cylinder is coupled to a lower end portion of the tube.

In the case of the above-described smoke tube heat exchanger, since the heat medium accommodated in the water tank applies a high water pressure to the lower plate, the lower plate requires water pressure resistance against the high water pressure to maintain durability.

However, the lower plate provided in the conventional smoke tube heat exchanger has a configuration inadequate to disperse water pressure and thus has weak durability.

Further, the conventional smoke tube boiler is formed in a structure provided with a condensate collector under the lower plate and a sealing member configured to prevent leakage of condensate between an edge portion of the lower plate and an edge portion of the condensate collector, and the sealing member is configured to support a lower end portion of a side surface portion of the lower plate.

However, according to a coupling structure of the sealing member between the lower plate and the condensate collector, the condensate generated from the smoke tube heat exchanger stagnates between the lower end portion of the side surface portion of the lower plate and the sealing member to cause corrosion of the lower plate, and when the sealing member is configured in a generally disclosed shape, the leakage of the condensate cannot be reliably blocked. A prior art related to a sealing structure of the conventional condensate collector is disclosed in Korean Laid-Open Patent No. 10-2005-0036152 and the like.

DISCLOSURE

Technical Problem

The present invention is directed to providing a smoke tube boiler capable of preventing leakage of a mixed gas and an exhaust gas through a gap between a mix chamber and an ignition bar assembly.

Also, the present invention is directed to providing a smoke tube boiler including a cooling means configured to significantly decrease the size of an insulation material to prevent blockage of a flow path due to damage of the insulation material and configured to block heat transfer to an ignition bar assembly or an ignition bar sealing member near the ignition bar assembly when installing the ignition bar assembly through a mix chamber.

Also, the present invention is directed to providing a smoke tube boiler having a structure capable of improving the water pressure resistance of a lower plate, preventing corrosion due to stagnation of condensate in the lower plate, and reliably blocking leakage of the condensate.

Also, the present invention is directed to providing a smoke tube boiler having a decreased height and capable of improving heat exchange efficiency in comparison with a conventional boiler.

Technical Solution

One aspect of the present invention provides a smoke tube boiler including: a mix chamber having a mixing space in which a combustion gas and air are mixed and a flat plate type burner and disposed on a combustion chamber; an ignition bar assembly configured to pass through one side portion of the mix chamber to be assembled and extend in a downward direction from the flat plate type burner across an upper portion of the combustion chamber; and a sealing member configured to block leakage of a mixed gas of the mixing space and an exhaust gas of the combustion chamber to the outside through a gap between the mix chamber and the ignition bar assembly.

A mix chamber flange and a burner flange may be provided at the one side portion of the mix chamber to meet each other to seal the mixing space, and the ignition bar assembly may pass through the mix chamber flange and the burner flange at a location spaced apart from the mixing space to be assembled.

The sealing member may include a first sealing member provided at a portion in which the mix chamber flange and the burner flange meet each other to prevent leakage of the mixed gas.

An insulation material configured to block transfer of combustion heat generated from the combustion chamber may be provided on the first sealing member. The size of the insulation material may be significantly decreased unlike a conventional art.

A coupling plate through which the ignition bar assembly passes to be coupled thereto may be provided on the one side portion of the mix chamber, and the sealing member may include a second sealing member provided between an upper portion of the one side portion of the mix chamber and the coupling plate to prevent leakage of the exhaust gas.

A plurality of contact protrusions formed to protrude to the outside may be formed at predetermined intervals on an outer side surface of the second sealing member.

The ignition bar assembly may include an ignition bar and a flame sensing bar, an ignition bar coupling plate through which the ignition bar passes to be coupled thereto and a flame sensing bar coupling plate through which the flame sensing bar passes to be coupled thereto may be provided on the one side portion of the mix chamber, and the sealing member may be provided between the upper portion of the one side portion of the mix chamber and the ignition bar coupling plate and between the upper portion of the one side portion of the mix chamber and the flame sensing bar coupling plate.

The smoke tube boiler may further include a cooling means configured to block transfer of the combustion heat generated from the combustion chamber (C) to the sealing member.

The cooling means may include an air cooling type cooling means and a water cooling type cooling means.

The mix chamber flange and the burner flange may be provided at the one side portion of the mix chamber to meet each other to seal the mixing space, the ignition bar assembly may pass through the mix chamber flange and the burner flange to be assembled, and the mix chamber flange and the burner flange may be cooled by the mixed gas introduced into the mixing space in the air cooling type cooling means.

The mix chamber flange and the burner flange may be provided at the one side portion of the mix chamber to meet each other to seal the mixing space, the ignition bar assembly may pass through the mix chamber flange and the burner flange to be assembled, and an upper plate flange configured to come into contact with a heat medium of a heat exchanger provided under the combustion chamber may be provided to come into contact with the burner flange to cool the burner flange in the water cooling type cooling means.

A plurality of radiating fins may be provided on the one side portion of the mix chamber at which the ignition bar assembly is assembled along an edge of the ignition bar assembly.

The smoke tube boiler may include an outer cylinder provided at an edge of a tube through which the combustion gas passes the inside thereof to form an outer wall of a water tank in which the heat medium is accommodated at the outside of the tube, and a lower plate having an end plate structure and formed of a horizontal portion configured to support a lower end portion of the tube and form a bottom surface of the water tank, a vertical portion coupled to an outer side surface of a lower end portion of the outer cylinder, and a round portion configured to connect an outer end of the horizontal portion and a lower end portion of the vertical portion and formed in an outwardly convexly curved shape to disperse a water pressure of the heat medium.

The vertical portion of the lower plate may be fit-coupled to the outer side surface of the lower end portion of the outer cylinder.

A flange part configured to extend in an outward direction by a predetermined length may be formed on the vertical portion of the lower plate, and the flange part and the outer side surface of the outer cylinder may be coupled to each other by welding.

The smoke tube boiler may include a condensate collector provided under the lower plate to collect condensate generated from the lower plate and a leakage prevention member provided between an edge portion of the lower plate and an edge portion of the condensate collector to prevent leakage of the condensate.

The leakage prevention member may be provided in a shape which surrounds a lower portion of each of the round portion and the vertical portion of the lower plate, and the condensate formed on the horizontal portion of the lower plate may be blocked from moving in a lateral direction by a blockage of the leakage prevention member and may drop in a downward direction.

A sidewall of the condensate collector may be provided to be located near a boundary between the horizontal portion and the round portion of the lower plate to guide dropping of the condensate.

A contact protrusion configured to protrude toward an outer side surface of the lower plate may be formed on an inner side surface of the leakage prevention member.

A plurality of contact protrusions may be formed at locations vertically spaced apart from the inner side surface of the leakage prevention member.

A first flange part configured to extend in an outward direction from an upper end of the sidewall of the condensate collector to support a lower portion of the leakage prevention member may be provided at the edge portion of the condensate collector, and a fastening protrusion and a fastening groove fastened to each other at corresponding locations may be provided at the leakage prevention member and the first flange part.

The smoke tube boiler may further include an extending portion configured to extend in an upward direction from an outer end of the first flange part and come into close contact with an outer side surface of the leakage prevention member and a second flange part configured to extend in an outward direction from an end of the extending portion at the edge portion of the condensate collector, wherein a fitting protrusion and a fitting groove fitted to each other at corresponding locations may be formed on an upper portion of the leakage prevention member and the second flange part to block the leakage of the condensate and fix a location of the leakage prevention member.

An exhaust guide, having a plurality of punched holes formed therein so that the combustion gas which passes through the heat exchanger is uniformly distributed to the entire area of the condensate collector to be discharged, may be provided in the condensate collector.

A stair part configured to guide a flow of the combustion gas which passes through the exhaust guide to the condensate drain port may be formed on a bottom surface of the condensate collector so that a drainage direction of the condensate and a flow direction of the combustion gas may be the same in the condensate collector.

The mix chamber may include a flat-shaped mix chamber body and the flat plate type burner disposed on the combustion chamber in a horizontal direction.

A separation space between a lower surface of the mix chamber body and an upper surface the flat plate type burner may be formed in a flat disc shape.

The smoke tube boiler may further include a heat exchanger in which heat exchange between combustion heat of the combustion chamber and the heat medium is performed, wherein the heat exchanger may include an outer cylinder through which the heat medium is introduced and discharged and forming the outer wall of the water tank in which the heat medium is accommodated, an upper plate having an end plate structure coupled to an inner side of the outer cylinder and forming the combustion chamber so that a heat medium path is formed between the upper plate and the outer cylinder, a plurality of tubes each formed in a flat shape so that the combustion gas generated from the combustion chamber is heat-exchanged with the heat medium which flows through the outside while flowing along the insides of the tubes, a turbulator coupled to inner sides of the tubes to induce generation of turbulence in a flow of the combustion gas, a multilayer diaphragm provided between the outer cylinder and the tube to guide the heat medium so that a flow direction of the heat medium is alternately switched inward and outward in a radial direction, and a lower plate having an end plate structure configured to support lower end portions of the tubes and form a bottom surface of the water tank.

A flange of the upper plate may be formed to protrude from an upper end of the round portion to the outside, and a ratio of a diameter difference between an outer diameter of the flange of the upper plate and an inner diameter of a lower end of the round portion may be smaller than or equal to 20%.

A height between a lower surface of the flat plate type burner inserted into the upper plate and a bottom surface of the upper plate may be set so that a tip of a flame generated from the flat plate type burner may be spaced apart from the bottom surface of the upper plate by a predetermined distance, preferably, by a height of about 80 mm.

The turbulator may include an upper turbulator coupled to an inner side of an upper portion of the tube adjacent to the combustion chamber to come into surface contact with the tube to increase heat conductivity and induce generation of the turbulence in the flow of the combustion gas, and a lower turbulator coupled to an inner side of the tube in a downward direction from the upper turbulator to induce generation of the turbulence in the flow of the combustion gas.

Advantageous Effects

In a smoke tube boiler according to the present invention, when an ignition bar assembly is installed through one side portion of a mix chamber to apply a flat plate type burner which is easy to manufacture and has greater productivity in comparison with a cylindrical burner, leakage of a mixed gas and an exhaust gas can be prevented.

Further, when the flat plate type burner having a combustion area formed to be greater than that of the cylindrical burner is used, a cooling structure for the ignition bar assembly coupled through one side portion of the mix chamber is advantageous due to a gas and air introduced into the combustion area, and durability can be improved by preventing damage due to deterioration.

In addition, since a lower plate is configured to surround an outer side surface of an outer cylinder and a convexly curved round portion is formed at a corner configured to connect a horizontal portion and a vertical portion of the lower plate to disperse a water pressure of a heat medium, the durability can be improved by improving water pressure resistance of the lower plate to minimize deformation.

In addition, since the lower plate of the smoke tube heat exchanger is configured to surround the outer side surface of the outer cylinder, a leakage prevention member is configured in a shape which surrounds a lower portion of the vertical portion of the lower plate and the round portion, and a sidewall of a condensate collector is disposed to be located near a boundary between the horizontal portion and the round portion of the lower plate to guide the dropping of condensate, the occurrence of corrosion due to stagnation of the condensate can be prevented.

In addition, since contact protrusions configured to protrude in a direction toward an outer side surface of the lower plate are formed on an inner side surface of the leakage prevention member, the contact protrusion of the leakage prevention member configured to protrude in a direction opposite to a direction in which a water pressure acts comes into contact with the outer side surface of the lower plate to prevent leakage of the condensate when the water pressure is applied. In addition, when a plurality of contact protrusions are formed at locations vertically spaced apart from each other, the leakage of the condensate can be more reliably prevented.

In addition, since a flat-shaped mix chamber body and the flat plate type burner are provided, an upper plate formed in an end plate structure is lowered to a minimum height at which mixed air is completely combusted and the heat exchange efficiency of the heat exchanger is improved, the height of the boiler can be lowered in comparison with a conventional boiler such that a smoke tube boiler having high efficiency and a compact size can be provided.

DESCRIPTION OF DRAWINGS

FIG. 10 is an exploded perspective view of a main portion of the boiler having the smoke tube heat exchanger according to the embodiment of the present invention.

FIG. 11A is a plan view of a leakage prevention member, and FIG. 11B shows a cross-sectional view and an enlarged view taken along line B-B in FIG. 11A.

FIG. 12 is a cross-sectional view of part A in FIG. 1.

FIG. 13 is a perspective view of an exterior of a smoke tube boiler according to another embodiment of the present invention.

FIG. 14 is a perspective view of a mix chamber.

FIG. 15 is a perspective view of a lower surface of the mix chamber.

FIG. 16 is an exploded perspective view illustrating a structure in which an ignition bar and a flame sensing bar are coupled to the mix chamber.

FIG. 17 is a plan view of the mix chamber and a heat exchanger.

FIG. 18 is a partial cross-sectional perspective view taken along line C-C in FIG. 17.

FIG. 19 is a partial cross-sectional view taken along line C-C in FIG. 17.

FIG. 20 is a cross-sectional view illustrating a coupling structure between an upper plate and a burner.

FIG. 21 is a perspective view of the heat exchanger.

FIG. 22 is an exploded perspective view of the heat exchanger.

FIG. 23 is a front view of a state in which a tube assembly and a multilayer diaphragm are coupled to each other.

FIG. 24A is a plan view of FIG. 23, FIG. 24B is a cross-sectional view taken along line D-D in FIG. 23, and FIG. 24C is a cross-sectional view taken along line E-E in FIG. 23.

FIG. 25 is a plan view of the heat exchanger.

FIG. 26 is a cross-sectional perspective view taken along line F-F in FIG. 25.

FIG. 27 is a perspective view illustrating an embodiment of the tube assembly.

FIG. 28 is an exploded perspective view of the tube assembly.

FIG. 29 is a front view of an upper turbulator and a lower turbulator.

FIG. 30 is an enlarged perspective view of the upper turbulator shown in FIG. 29.

FIG. 31 is a plan view of FIG. 30.

FIG. 32A is a cross-sectional view taken along line G-G in FIG. 31 and FIG. 32B is a cross-sectional perspective view taken along line G-G in FIG. 31.

FIG. 33 is a left side view of FIG. 30.

FIG. 34 is a perspective view of the smoke tube boiler according to another embodiment of the present invention.

FIG. 35 is an exploded perspective view of the smoke tube boiler according to another embodiment of the present invention.

FIG. 36A is a plan view of a leakage prevention member, and FIG. 36B shows a cross-sectional view and an enlarged view taken along line H-H in FIG. 36A.

FIG. 37 is a cross-sectional view illustrating a sealing structure and a condensate draining structure of the smoke tube boiler according to another embodiment of the present invention.

REFERENCE NUMERALS

Figure 1:
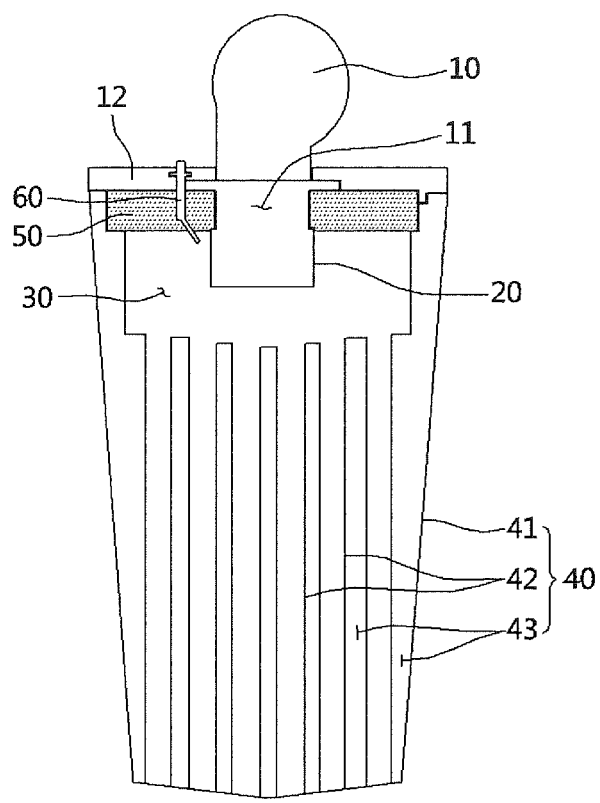
FIG. 1 is a view schematically illustrating a configuration of a conventional smoke tube boiler.

| | |
|---|---|
| 10: blower | 11: mix chamber |
| 12: combustion chamber cover | 20: cylindrical burner |
| 30: combustion chamber | 40: heat exchanger |
| 41: outer cylinder | 42: tube |
| 43: water tank | 50: insulation material |
| 60: ignition bar | 1, 1': smoke tube boilers |
| 100: mix chamber | 110: mixed air introduction port |
| 120: mix chamber flange | 130: flat plate type burner |
| 131: flame hole plate | 131a: flame hole |
| 132: metal fiber | 133: burner flange |
| 140: ignition bar assembly | 141: first ignition bar |
| 142: second ignition bar | 143: flame sensing bar |
| 141a, 142a, 143a: insulators | 141b, 142b, 143b: bushings |
| 144: coupling plate | 144a, 144b, 144c: coupling holes |
| 150: ignition bar assembly coupling part | 151: coupling plate seating part |
| 152: second sealing member seating part | 153: through port |
| 154: radiating fin | 160: first sealing member |
| 170: insulation material | 180: second sealing member |
| 181: contact protrusion | 190: sealing member |
| 200: heat exchanger | 210: outer cylinder |
| 220: upper pipe plate | 221: tube insertion hole |
| 222: upper pipe plate flange | 230: tube |
| 240: water tank | 300: condensate collector |
| 400: air discharge duct | 500: leakage prevention member |
| 510: body | 510a: inner side surface of leakage prevention member |
| 520, 521, 522, 523, 524: contact protrusions | |
| 530: lower portion of leakage prevention member | |
| 531: fastening groove | 540: upper portion of leakage prevention member |
| 541: fitting protrusion | 1000: mix chamber |
| 1100: mix chamber body | 1110: mix chamber flange |

-continued

| | |
|---|---|
| 1200: mixed air introduction port | 1300: flat plate type burner |
| 1310: flame hole plate | 1330: burner flange |
| 1400: ignition bar assembly | 1410: ignition bar |
| 1420: flame sensing bar | 1500: ignition bar assembly coupling part |
| 1600: first sealing member | 1700: second sealing member |
| 1800: third sealing member | 1900: sealing member |
| 2000: heat exchanger | 2100: outer cylinder |
| 2110: heat medium introduction port | 2120: heat medium discharge port |
| 2200: upper pipe plate | 2240: round portion |
| 2300: tube | 10000: tube assembly |
| 2400: upper turbulator | 2500: lower turbulator |
| 2610: upper diaphragm | 2620: middle diaphragm |
| 2630: lower diaphragm | 2640: supporter |
| 2700: lower pipe plate | 3000: condensate collector |
| 3100: condensate drain port | 3200: leakage prevention member |
| 3300: exhaust guide | 3310: punched hole |
| 4000: air discharge duct | 5000: pre-mixing chamber |
| 6000: mixed air adjusting part | 7000: blower |

MODES OF THE INVENTION

Hereinafter, the configuration and operation of an embodiment of the present invention will be described in detail with reference to the accompanying drawings.

Referring to FIGS. 2 to 8, a smoke tube boiler 1 according to an embodiment of the present invention includes a mix chamber 100 having a mixing space S in which a combustion gas and air supplied through a mixed air introduction port 110 connected to a blower are mixed and a flat plate type burner 130 configured to burn the mixed air and disposed on a combustion chamber C, a heat exchanger 200 in which heat exchange between a heat medium and the combustion gas is performed, a condensate collector 300 configured to collect condensate generated when vapor which passes through the heat exchanger 200 and is included in the combustion gas is condensed, and an air discharge duct 400 connected to one side of the condensate collector 300 so that the combustion gas which passes through the heat exchanger 200 is discharged.

Further, the smoke tube boiler 1 includes an ignition bar assembly 140 configured to pass through one side portion of the mix chamber 100 to be assembled and extend across an upper portion of the combustion chamber C to a lower side of the flat plate type burner 130, and a sealing member configured to block leakage of a mixed gas of the mixing space S and an exhaust gas of the combustion chamber C to the outside through a gap between the mix chamber 100 and the ignition bar assembly 140.

A burner applied to the present invention is the flat plate type burner 130 and includes a flame hole plate 131 having a flat plate shape in which plurality of flame holes 131a are formed and a metal fiber 132 coupled to the flame hole plate 131. The flat plate type burner 130 is provided over the entire area of the mixing space S and is thus advantageous for an air cooling type structure due to gas and air introduced thereinto, and since a combustion area is expanded to decrease load per unit area, the discharge of pollutants such as CO, NOx, and the like can be decreased to improve combustion performance.

The ignition bar assembly 140 passes through one side portion of the mix chamber 100 to be assembled. The ignition bar assembly 140 may include a first ignition bar 141, a second ignition bar 142, and a flame sensing bar 143. Insulators 141a, 142a, and 143a made of an insulating material are coupled to outer side surfaces of the first ignition bar 141, the second ignition bar 142, and the flame sensing bar 143, respectively, and bushings 141b, 142b, and 143b are coupled to outer side surfaces of the insulators 141a, 142a, and 143a, respectively, to maintain airtightness.

The first ignition bar 141, the second ignition bar 142, the flame sensing bar 143 and the insulators 141a, 142a, and 143a and the bushings 141b, 142b, and 143b coupled to the outer side surfaces of the first ignition bar 141, the second ignition bar 142, and the flame sensing bar 143 are coupled to each other by passing through coupling holes 144a, 144b, and 144c formed in a coupling plate 144.

The insulators 141a, 142a, and 143a are insulation means configured to prevent the generation of sparks due to energization at the time of ignition, and the bushings 141b, 142b, and 143b are configurations for sealing gaps between the outer side surfaces of the insulators 141a, 142a, and 143a and the coupling holes 144a, 144b, and 144c.

Figure 4:
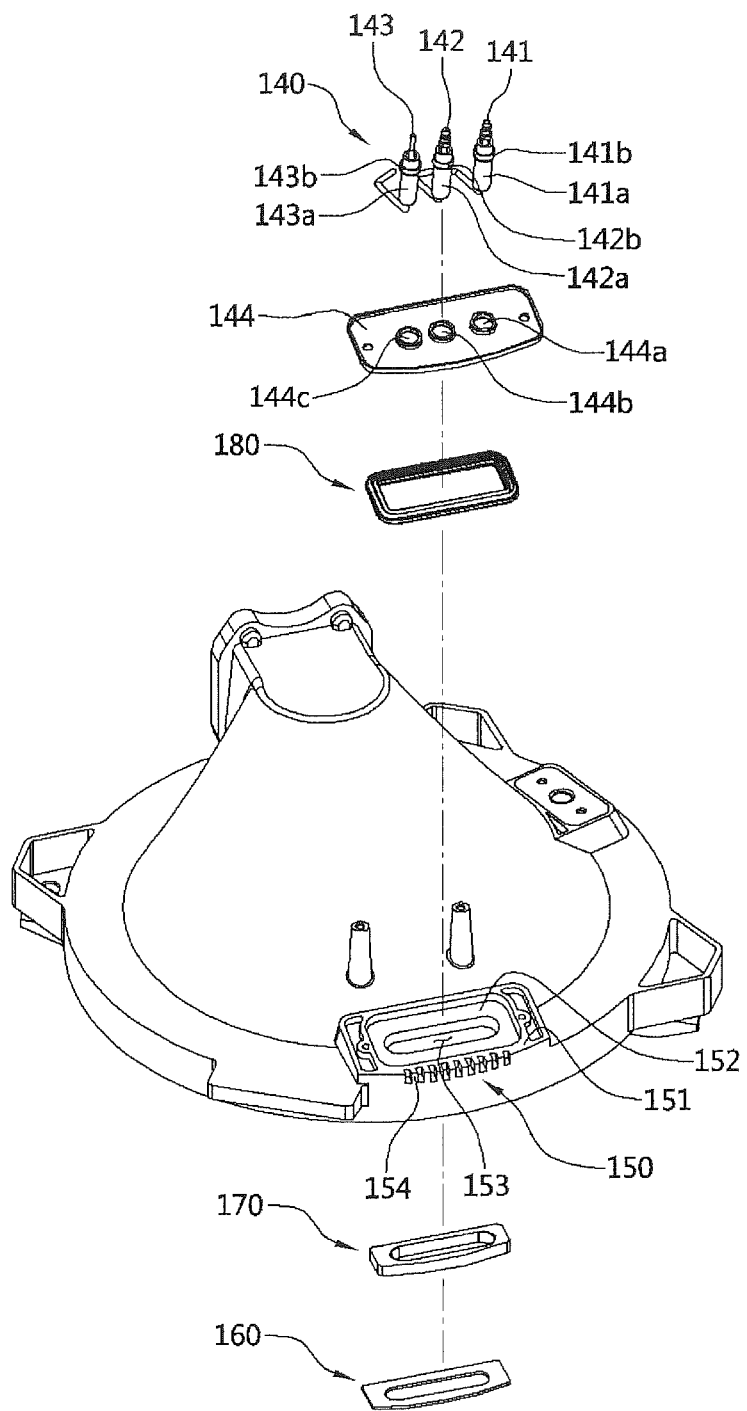
FIG. 4 is an exploded perspective view illustrating a structure in which an ignition bar assembly is coupled to the mix chamber.
Figure 5:
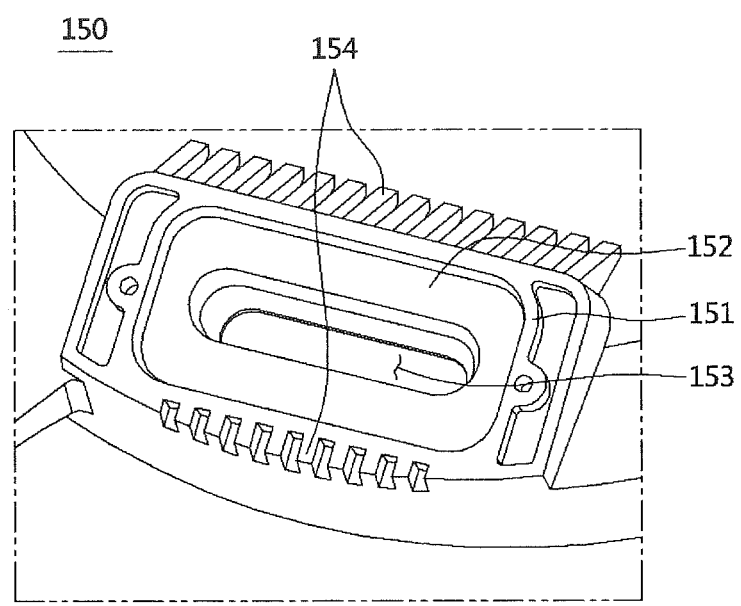
FIG. 5 is an enlarged perspective view of an ignition bar assembly coupling part.

Referring to FIGS. 4 and 5, an ignition bar assembly coupling part 150 configured to assemble the ignition bar assembly 140 is provided on one side portion of the mix chamber 100. The ignition bar assembly coupling part 150 includes a coupling plate seating part 151 formed in a groove shape so that the coupling plate 144 is seated thereon, a second sealing member seating part 152 formed inward from the coupling plate seating part 151 so that a second sealing member 180 is seated thereon, and a through port 153 through which the first ignition bar 141, the second ignition bar 142, and the flame sensing bar 143 pass. Further, a plurality of radiating fins 154 configured to radiate combustion heat are provided around the ignition bar assembly coupling part 150.

Figure 6:
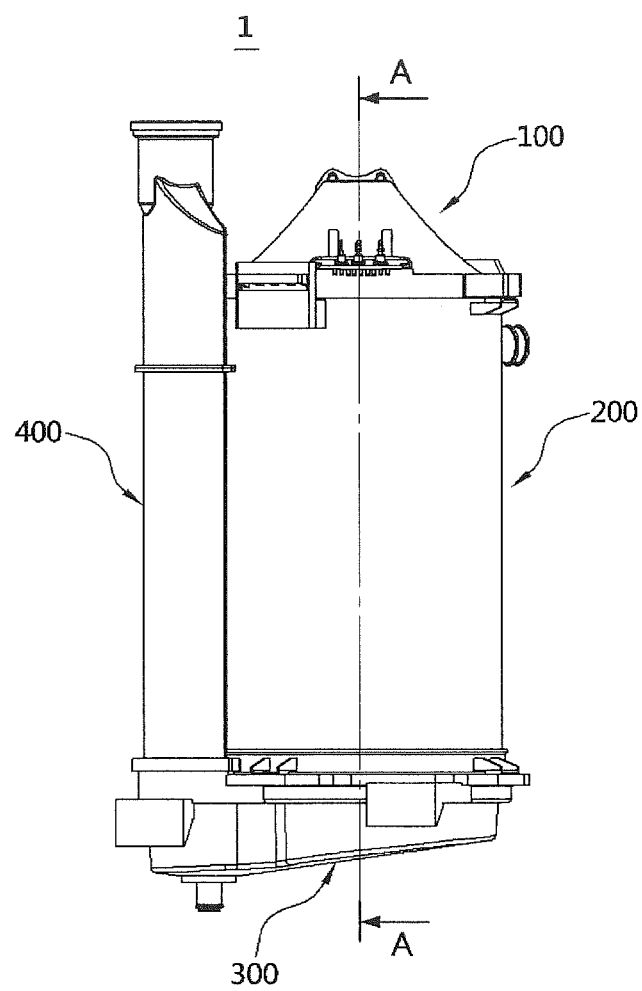
FIG. 6 is a front view of FIG. 2.
Figure 7:
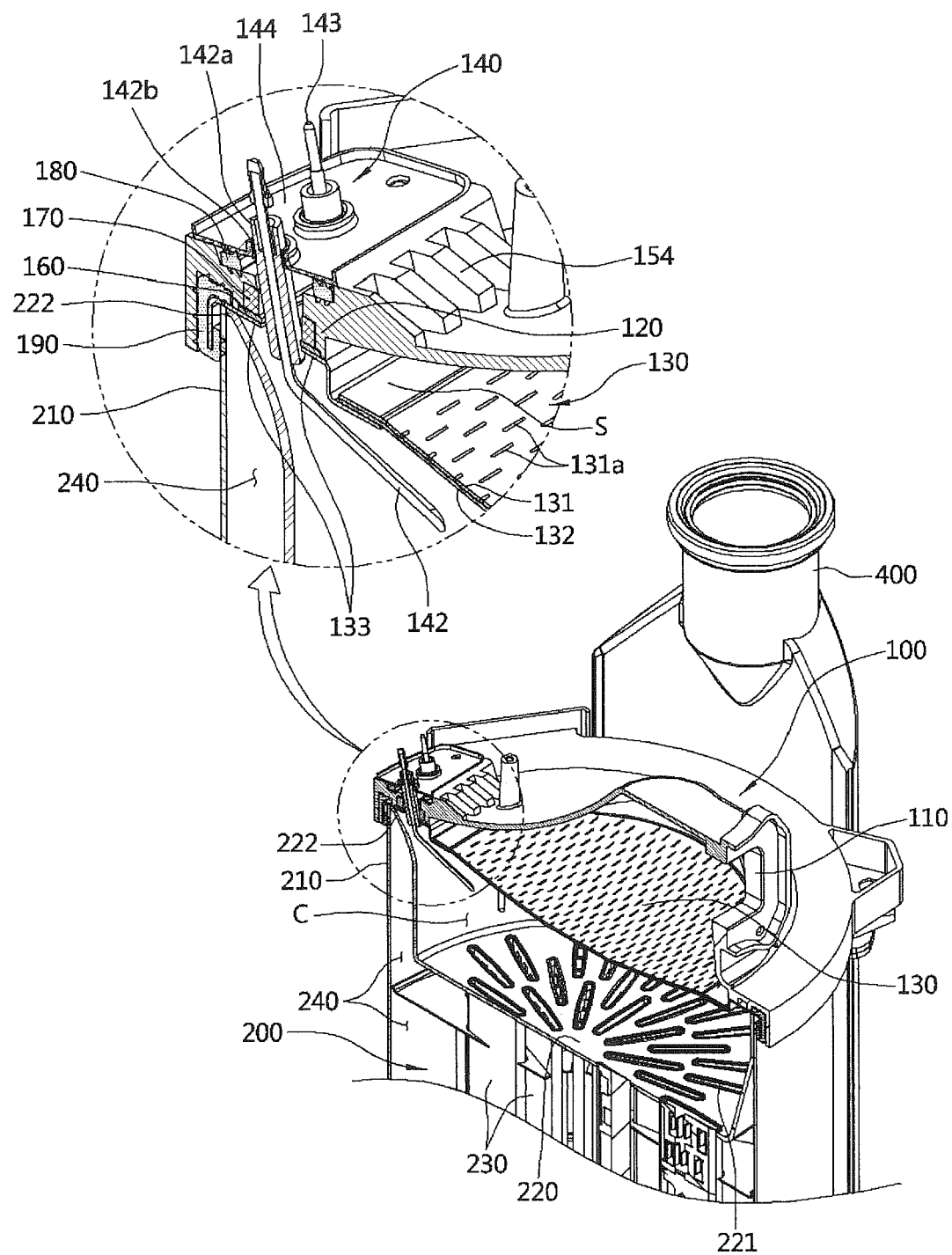
FIG. 7 is a partial cross-sectional perspective view taken along line A-A in FIG. 6.
Figure 8:
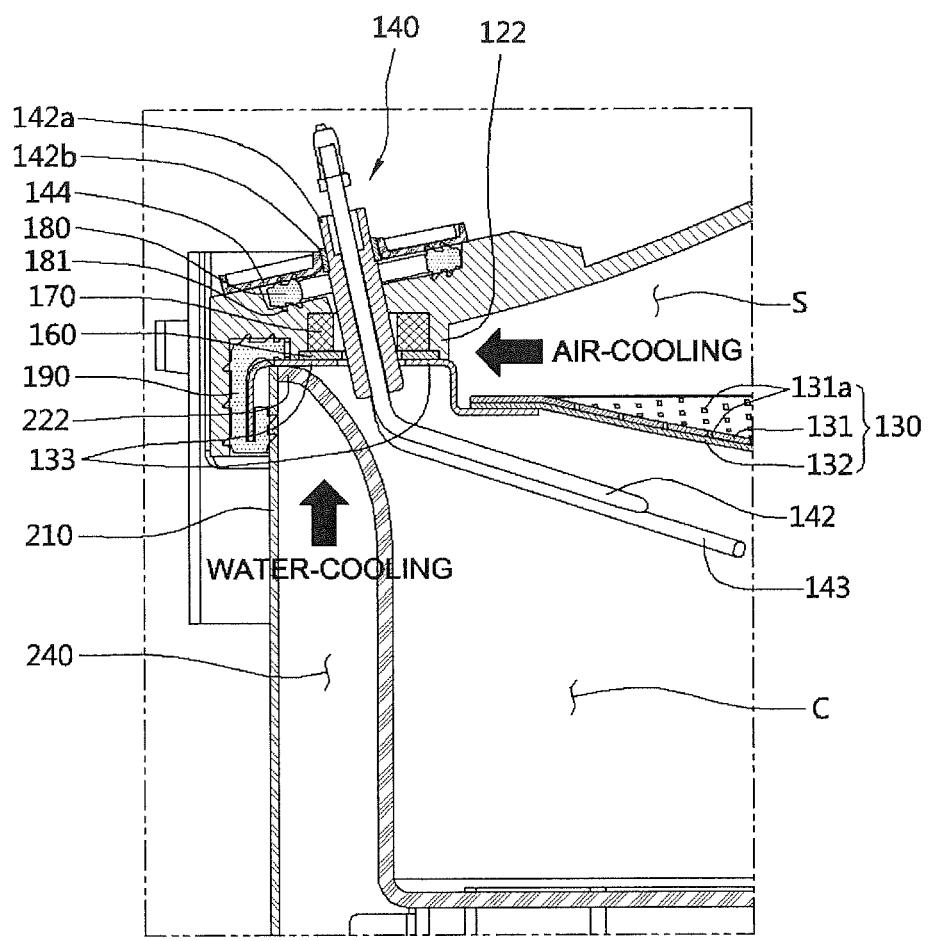
FIG. 8 is a partial enlarged cross-sectional view taken along line A-A in FIG. 6.

Referring to FIGS. 6 to 8, a mix chamber flange 120 and a burner flange 133 connected to an edge portion of the flat plate type burner 130 to support the edge portion of the flat plate type burner 130 are provided at one side portion of the mix chamber 100 to meet each other to seal the mixing space S, and the ignition bar assembly 140 passes through the mix chamber flange 120 and the burner flange 133 to be assembled at a location spaced apart from the mixing space S.

The sealing member may include a first sealing member 160 provided at a portion in which the mix chamber flange 120 and the burner flange 133 meet each other to prevent leakage of the mixed gas introduced into the mixing space S to the outside, and the first sealing member 160 may be formed of a heat resistant graphite material. Further, an insulation material 170 configured to block transfer of the combustion heat generated from the combustion chamber C is provided on the first sealing member 160.

In addition, the sealing member may include a second sealing member 180 provided between an upper portion of one side portion of the mix chamber 100 and the coupling plate 144 to prevent leakage of the exhaust gas generated from the combustion chamber C to the outside, and the second sealing member 180 may be formed of a rubber material. In addition, a plurality of contact protrusions 181 formed to protrude to the outside may be formed at predetermined intervals on an outer side surface of the second sealing member 180, and may come into close contact with a lower surface of the coupling plate 144 and an upper surface of the second sealing member seating part 152 to further improve sealability.

In addition, as described above, in the ignition bar assembly 140, since the bushings 141b, 142b, and 143b are coupled to the outer side surfaces of the insulators 141a, 142a, and 143a, respectively, the leakage of the exhaust gas or the mixed gas through the coupling holes 144a, 144b, and 144c of the coupling plate 144 may be blocked again.

Hereinafter, the configuration and operation of a cooling means configured to block the transfer of the combustion heat to the sealing member and radiate the combustion heat will be described below with reference to FIGS. 7 and 8.

The cooling means is a configuration for blocking the transfer of the combustion heat generated from the combustion chamber C to the sealing member configured to prevent leakage of the combustion heat through the gap between the mix chamber 100 and the ignition bar assembly 140 and may include an air cooling type cooling means and a water cooling type cooling means.

As described above, the mix chamber flange 120 and the burner flange 133 may be provided at one side portion of the mix chamber 100 to meet each other to seal the mixing space S, the ignition bar assembly 140 passes through the mix chamber flange 120 and the burner flange 133 to be assembled, and the air cooling type cooling means may be configured so that the mix chamber flange 120 and the burner flange 133 are cooled in a convection manner by the mixed gas introduced into the mixing space S.

Meanwhile, the heat exchanger 200 may include a smoke tube heat exchanger and may include an outer cylinder 210, an upper plate 220 forming a bottom surface of the combustion chamber C and an upper surface of the heat exchanger 200, a plurality of tubes 230 having upper end portions passing through a tube insertion hole 221 formed in the upper plate 220 to be coupled and through which the combustion gas flows by passing through the inside thereof, and a water tank 240 located at outer sides of the tubes 230 and in which the heat medium is accommodated in the outer cylinder 210. The heat medium may be heating water or warm water used for heating or warm water.

In the water cooling type cooling means, since an upper plate flange 222 configured to come into contact with the heat medium of the heat exchanger 200 provided under the combustion chamber C is provided to come into contact with the burner flange 133, the burner flange 133 and the sealing member 190 may be cooled in a conduction manner.

Further, as described above, a plurality of radiating fins 154 are provided on one side portion of the mix chamber 100, to which the ignition bar assembly 140 is assembled, along an edge of the ignition bar assembly 140, and the above also serve as a cooling means.

As described above, according to the present invention, since the sealing member and the cooling means are provided when the ignition bar assembly 140 passes through one side portion of the mix chamber 100 having the flat plate type burner 130 to be assembled, the leakage of the mixed gas and the exhaust gas may be blocked and thermal loss of the sealing member due to the combustion heat may be prevented. Further, since the problem of blockage of the tube due to an insulation material installed at one side of a lower end area of a conventional mix chamber may be prevented, and the insulation material 170 is used in only a part of a lower end of the ignition bar assembly 140, use of the insulation material may be minimized, the ignition bar assembly 140 may be safely assembled, and the leakage of the mixed gas and the exhaust gas due to damage of the sealing member may be prevented.

Referring to FIGS. 9 to 12, the smoke tube boiler 1 according to the embodiment of the present invention further includes a leakage prevention member 500 coupled to a connection portion between the above-described heat exchanger 200 and the condensate collector 300 to prevent leakage of the condensate.

Figure 9:
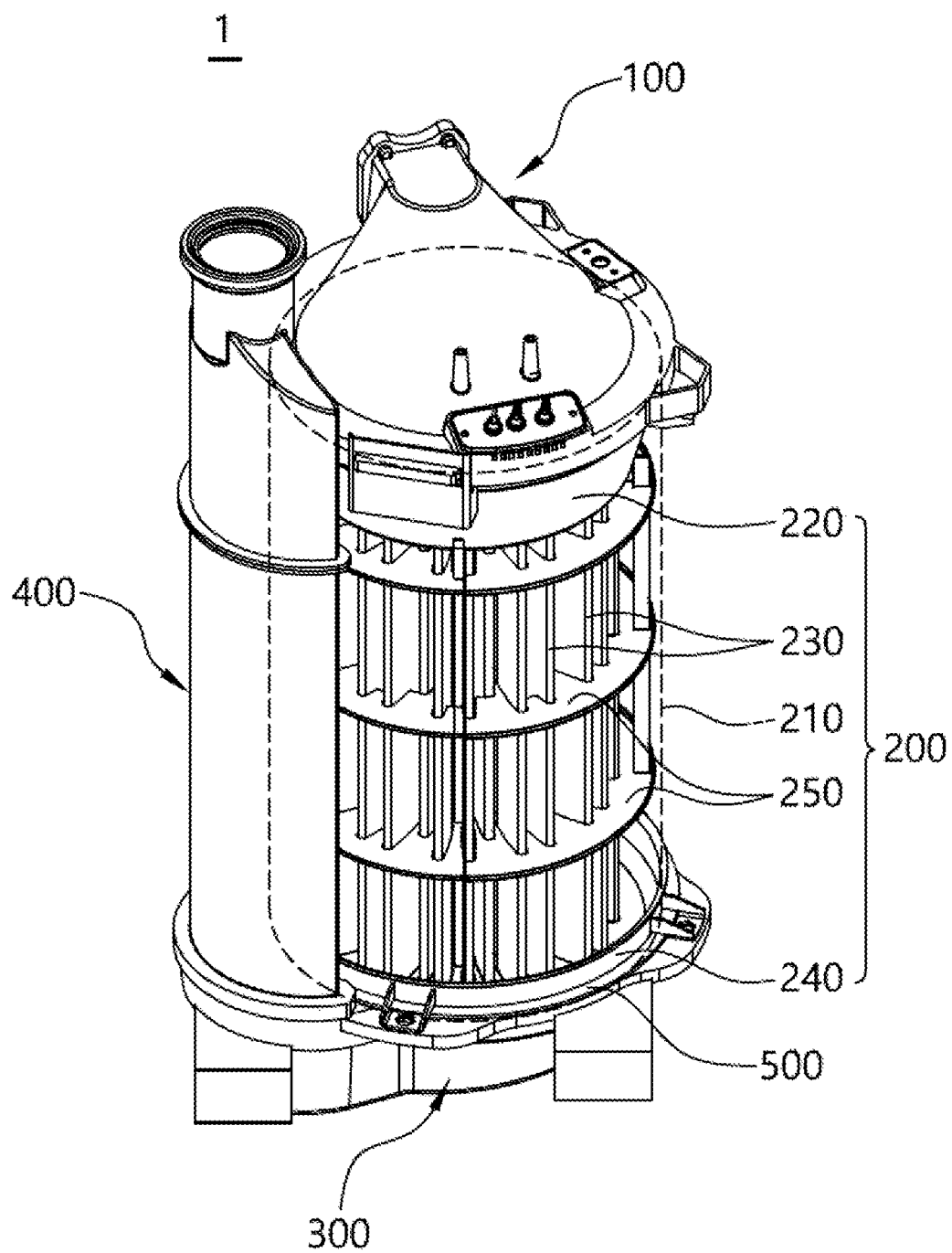
FIG. 9 is a partial perspective view of a portion of a boiler having a smoke tube heat exchanger according to the embodiment of the present invention.

Referring to FIG. 9, the heat exchanger 200 includes the outer cylinder 210 through which the heat medium is introduced and discharged and forming an outer wall of a water tank (S, see FIG. 12) in which the heat medium is accommodated, a plurality of tubes 230 configured to allow the combustion gas generated by ignition of the burner in the mix chamber 100 to flow along the inside thereof and to exchange heat with the heat medium, an upper plate 220 configured to support upper end portions of the tubes 230 and form an upper surface of the water tank S, a lower plate 240 configured to support lower end portions of the tubes 230 and form a bottom surface of the water tank S, and a supporting plate 250 coupled to locations vertically spaced apart from outer side surfaces of the tubes 230 to fix locations of the tube 230 and having a moving path of the heat medium formed therein.

Referring to FIG. 10, the lower plate 240 is formed in a shape in which an upper portion is open to be coupled while surrounding a lower outer side surface of the outer cylinder 210, and includes a horizontal portion 241 having a plurality of tube insertion holes 241a formed therein through which the lower end portions of the tubes 220 pass to support the lower end portions of the tubes 220 and form the bottom surface of the water tank S, a vertical portion 242 coupled to the outer side surface of a lower end portion of the outer cylinder 210, and a round portion 243 configured to connect an outer end of the horizontal portion 241 and a lower end portion of the vertical portion 242 and formed in a shape convexly curved toward the outside to disperse the water pressure of the heat medium accommodated in the water tank S.

Referring to FIG. 12, the vertical portion 242 of the lower plate 240 may be fit-coupled to the outer side surface of the lower end portion of the outer cylinder 210, a flange part 244 configured to extend in an outward direction by a predetermined length is formed at an upper end of the vertical portion 242 of the lower plate 240, and the flange part 244 and the outer side surface of the outer cylinder 210 may be coupled to each other by welding.

In the heat exchanger 200, since the lower plate 240 is coupled to the outer cylinder 210 to surround a lower outer side surface of the outer cylinder 210 and the round portion 243 having a shape convexly curved toward the outside is formed on a corner of the lower plate 240 which connects the horizontal portion 241 and the vertical portion 242, the water pressure of the heat medium may be dispersed and thus durability may be improved by improving the water pressure resistance of the lower plate 240 to minimize deformation of the lower plate 240.

Hereinafter, a coupling structure between the above-described heat exchanger 200, condensate collector 300, and leakage prevention member 500 will be described below.

Referring to FIGS. 11 and 12, the leakage prevention member 500 is provided between an edge portion of the lower plate 240 and an edge portion of the condensate collector 300 to prevent the leakage of the condensate. Since a body 510 of the leakage prevention member 500 is provided in a shape which surrounds a lower portion of each of the round portion 243 and the vertical portion 242 of the lower plate 240, condensate CW formed on the horizontal portion 241 of the lower plate 240 may be blocked from moving in a lateral direction by a blockage of a lower portion 530 of the body 510 and may drop in a downward direction.

A sidewall 310 of the condensate collector 300 may be provided to be located near a boundary between the horizontal portion 241 and the round portion 243 of the lower plate 240 to guide dropping of the condensate.

As described above, since an inner end of the lower portion 530 of the leakage prevention member 500 and the sidewall 310 of the condensate collector 300 are located near the boundary between the horizontal portion 241 and the round portion 243 of the lower plate 240, the condensate CW formed on a lower surface of the horizontal portion 241 of the lower plate 240 may be collected in the condensate collector 300 by flowing in a downward direction through the inner end of the lower portion 530 of the leakage prevention member 500 and the sidewall 310 of the condensate collector 300 even while moving in a lateral direction, and accordingly, stagnation of the condensate CW and corrosion of the lower plate 240 according to the above may be prevented.

Meanwhile, a contact protrusion 520 configured to protrude toward an outer side surface of the lower plate 240 may be formed on an inner side surface 510a of the leakage prevention member 500. A plurality of contact protrusions 521, 522, 523, and 524 may be formed at locations vertically spaced apart from the inner side surface 510a of the leakage prevention member 500.

According to configurations of the above-described contact protrusions 520, the contact protrusions 520 of the leakage prevention member 500 configured to protrude in a direction opposite to a direction in which the water pressure acts may come into contact with the outer side surface of the lower plate 240 to prevent a phenomenon in which the condensate CW permeates between the lower plate 240 and the leakage prevention member 500 to leak. Further, when the plurality of contact protrusions 520 are formed at locations vertically spaced apart from each other, the leakage of the condensate CW may be more reliably prevented.

Meanwhile, since a first flange part 320 configured to extend in an outward direction from an upper end of the sidewall 310 of the condensate collector 300 to support the lower portion 530 of the leakage prevention member 500 is provided at an edge portion of the condensate collector 300 and a fastening protrusion 321 and a fastening groove 531 fastened to each other at corresponding locations are provided at the lower portion 530 of the leakage prevention member 500 and the first flange part 320, the leakage of the condensate CW may be blocked and the location of the leakage prevention member 500 may be fixed.

Further, since the edge portion of the condensate collector 300 includes an extending portion 330 configured to extend in an upward direction from an outer end of the first flange part 320 and come into close contact with an outer side surface of the leakage prevention member 500 and a second flange part 340 configured to extend in an outward direction from an end of the extending portion 330. A fitting protrusion 541 and a fitting groove 341 fitted to each other at corresponding locations are formed on an upper portion 540 of the leakage prevention member 500 and the second flange part 340, the leakage of the condensate CW may be blocked and the location of the leakage prevention member 500 may be fixed.

In the smoke tube boiler 1 according to the embodiment of the present invention as described above, the pressure resistance and durability may be improved by a coupling structure between the lower plate 240 and the outer cylinder 210 and a structure of the lower plate 240 including the round portion 243, the stagnation of the condensate CW may be prevented by a location relation of the leakage prevention member 500 interposed between the edge portion of the lower plate 240 and the edge portion of the condensate collector 300, and the leakage of the condensate CW may be efficiently prevented by the configuration of the contact protrusion 520 formed on the leakage prevention member 500.

Hereinafter, the configuration and operation of a smoke tube boiler 1' according to another embodiment of the present invention will be described below with reference to FIGS. 13 to 37.

The smoke tube boiler 1' according to another embodiment of the present invention includes: a mix chamber 1000 having a mixing space S in which a combustion gas and air are mixed, a mix chamber body 1100 formed in a flat shape, and a flat plate type burner 1300 disposed on a combustion chamber C in a horizontal direction; a heat exchanger 2000, wherein the heat exchanger 2000 includes an outer cylinder 2100 through which a heat medium is introduced and discharged and forming an outer wall of a water tank B in which the heat medium is accommodated, an upper plate 2200 having an end plate structure coupled to an inner side of the outer cylinder 2100 and forming the combustion chamber C so that a heat medium path is formed between the upper plate 2200 and the outer cylinder 2100, a plurality of tubes 2300 each formed in a flat shape so that the combustion gas generated from the combustion chamber C is heat-exchanged with the heat medium which flows through the outside while flowing along the insides of the tubes 2300, turbulators 2400 and 2500 coupled to inner sides of the tubes 2300 to cause turbulence in a flow of the combustion gas, multilayer diaphragms 2610, 2620, and 2630 provided between the outer cylinder 2100 and the tubes 2300 to guide the heat medium so that the flow direction of the heat medium is alternately switched inward and outward in a radial direction, and a lower plate 2700 having an end plate structure configured to support lower end portions of the tubes 2300 and form a bottom surface of the water tank B; and a condensate collector 3000 configured to collect condensate CW generated from the lower plate 2700 to guide the condensate CW to a condensate drain port 3100 formed at one side thereof and guide the combustion gas which passes through the tubes 2300 to an air discharge duct 4000 connected to an upper side of the condensate drain port 3100 and provided at one side of the outer cylinder 2100.

Further, the present invention further includes a pre-mixing chamber 5000 in which the combustion gas and the air supplied to the mix chamber 1000 are pre-mixed and a mixed air adjusting part 6000 configured to open and close a flow path of the air and gas which passes through the pre-mixing chamber 5000 to adjust a supply flow rate of the mixed air.

Referring to FIGS. 13 to 19, the mix chamber 1000 includes the mix chamber body 1100 which is convex in an upward direction and formed in a flat shape, an ignition bar assembly 1400 configured to pass through one side portion of the mix chamber body 1100 to be assembled and extend in a downward direction from the flat plate type burner 1300 across an upper portion of the combustion chamber C, and sealing member 1600, 1700, and 1800 configured to block leakage of a mixed gas of the mixing space S and an exhaust gas of the combustion chamber C to the outside through a gap between the mix chamber 1000 and the ignition bar assembly 1400.

A burner applied to the present invention is the flat plate type burner 1300 and includes a flame hole plate 1310 having a flat plate shape in which plurality of flame holes 1310a are formed and a metal fiber 1320 is coupled to the flame hole plate 1310. A separation mixing space S between a lower surface of the mix chamber body 1100 and an upper surface the flat plate type burner 1300 may be formed in a flat disc shape to form the mix chamber 1000 at a low height.

Further, unlike a conventional cylindrical burner, since the flat plate type burner 1300 is provided in the entire area of the mixing space S and thus the gas and air introduced thereinto are supplied to an edge portion thereof, that is, a location adjacent to locations at which the sealing member 1600, 1700, and 1800 are provided, the sealing member 1600, 1700, and 1800 may be cooled in an air cooling type manner by the gas and air, and since a combustion area is expanded to decrease load per unit area, the discharge of pollutants such as CO, NOx, and the like can be decreased to improve combustion performance.

The ignition bar assembly 1400 configured to pass through one side portion of the mix chamber 1000 to be assembled may include an ignition bar 1410 and a flame sensing bar 1420, and the ignition bar 1410 may include a first ignition bar 1410-1 and a second ignition bar 1410-2. Insulators 1410*a* and 1420*a* made of an insulating material are coupled to outer side surfaces of the ignition bar 1410 and the flame sensing bar 1420, respectively, and bushings 1410*b* and 1420*b* are coupled to outer side surfaces of the insulators 1410*a* and 1420*a*, respectively, to maintain airtightness.

The ignition bar 1410, the insulator 1410*a*, and the bushing 1410*b* are fixed to an ignition bar coupling plate 1430, and the flame sensing bar 1420, the insulator 1420*a*, and the bushing 1420*b* are fixed to a flame sensing bar coupling plate 1440. The insulators 1410*a* and 1420*a* are insulation means configured to prevent the generation of sparks due to energization when ignition is performed, and the bushings 1410*b* and 1420*b* are configurations for sealing gaps between the outer surfaces of the insulators 1410*a* and 1420*a*, the ignition bar coupling plate 1430 and the flame sensing bar coupling plate 1440.

Referring to FIG. 16, an ignition bar assembly coupling part 1500 configured to assemble the ignition bar assembly 1400 is provided on one side portion of the mix chamber 1000. The ignition bar assembly coupling part 1500 includes a second sealing member seating part 1510 formed in a groove shape so that the ignition bar coupling plate 1430 and the second sealing member 1700 coupled to a lower side of the ignition bar coupling plate 1430 are seated thereon and a third sealing member seating part 1520 formed in a groove shape so that the flame sensing bar coupling plate 1440 and a third sealing member 1800 coupled to a lower side of the flame sensing bar coupling plate 1440 are seated thereon. Further, a plurality of radiating fins 1530 configured to radiate combustion heat are provided on an edge of the ignition bar assembly coupling part 1500.

Referring to FIGS. 17 to 19, a mix chamber flange 1110 and a burner flange 1330 connected to an edge portion of the flat plate type burner 1300 to support the edge portion of the flat plate type burner 1300 are provided at one side portion of the mix chamber 1000 to meet each other to seal the mixing space S, and the ignition bar assembly 1400 passes through the mix chamber flange 1110 and the burner flange 1330 to be assembled at a location spaced apart from the mixing space S.

The sealing member may include a first sealing member 1600 provided at a portion in which the mix chamber flange 1110 and the burner flange 1330 meet each other to prevent leakage of the mixed gas introduced into the mixing space S to the outside, and the first sealing member 1600 may be formed of a heat resistant graphite material.

Further, the sealing member may include a second sealing member 1700 provided between mix chamber flange 1110 and the ignition bar coupling plate 1430 to prevent leakage of the exhaust gas generated from the combustion chamber C to the outside, and a third sealing member 1800 provided between the mix chamber flange 1110 and the flame sensing bar coupling plate 1440 to prevent the leakage of the exhaust gas generated from the combustion chamber C to the outside. In addition, the second sealing member 1700 and the third sealing member 1800 may be formed of a rubber material and may be separately manufactured as separate components and then assembled to minimize deformation of the rubber material due to a high temperature.

In addition, a plurality of contact protrusions 1710 formed to protrude to the outside may be formed at a predetermined interval on an outer side surface of each of the second sealing member 1700 and the third sealing member 1800, and may come into close contact with a lower surface of the ignition bar coupling plate 1430, an upper surface of the second sealing member 1700, a lower surface of the coupling plate 1440, and an upper surface of the third sealing member 1800 to further improve sealability.

In addition, as described above, in the ignition bar assembly 1400, since the bushings 1410*b* and 1420*b* are coupled to the outer side surfaces of the insulators 1410*a* and 1420*a*, respectively, the leakage of the exhaust gas or the mixed gas to the outside of the mix chamber 1000 may be blocked again.

Hereinafter, the configuration and operation of a cooling means configured to block the transfer of the combustion heat to the sealing member and radiate the combustion heat will be described below with reference to FIGS. 18 and 19.

The cooling means is a configuration for blocking the transfer of the combustion heat generated from the combustion chamber C to the sealing member configured to prevent leakage of the combustion heat through the gap between the mix chamber 1000 and the ignition bar assembly 1400 and may include an air cooling type cooling means and a water cooling type cooling means.

As described above, the mix chamber flange 1110 and the burner flange 1330 may be provided at one side portion of the mix chamber 1000 to meet each other to seal the mixing space S, the ignition bar assembly 1400 passes through the mix chamber flange 1110 and the burner flange 1330 to be assembled, and the air cooling type cooling means may be configured so that the mix chamber flange 1110 and the burner flange 1330 are cooled in a convection manner by the mixed gas introduced into the mixing space S.

Meanwhile, the heat exchanger 2000 may include a smoke tube heat exchanger and may include an outer cylinder 2100, an upper plate 2200 forming a bottom surface of a combustion chamber C and an upper surface of a heat exchanger 2000, a plurality of tubes 2300 having upper end portions coupled through a tube insertion port 2210*a* formed in the upper plate 2200 and through which the combustion gas flows through the inside thereof, and a water tank B located at outer sides of the tubes 2300 and in which the heat medium is accommodated in the outer cylinder 2100. The heat medium may be heating water or warm water used for heating or warm water.

In the water cooling type cooling means, an upper plate flange 2230 configured to come into contact with the heat medium of the heat exchanger 2000 provided under the combustion chamber C is provided to come into surface contact with the burner flange 1330, and the burner flange 1330 and the sealing member 1600, 1700, and 1800 may be cooled by the heat medium stored in the water tank B in a conduction manner.

Further, as described above, a plurality of radiating fins 1530 are provided on one side portion of the mix chamber body 1100, to which the ignition bar assembly 1400 is assembled, along an edge of the ignition bar assembly 140, and the above also serve as a cooling means.

As described above, according to the present invention, since the mix chamber 1000 includes the flat shaped mix chamber body 1100 and the flat plate type burner 1300, the height of the mix chamber 1000 may be significantly decreased in comparison with the structure having a conventional cylindrical burner.

Further, since the sealing member and the cooling means are provided to allow the ignition bar assembly 1400 to pass through one side portion of the mix chamber 1100 having the flat plate type burner 1300 to be assembled, the leakage of the mixed gas and the exhaust gas may be blocked and thermal damage of the sealing member due to the combustion heat may be prevented. Accordingly, since an insulation material is not used in the mix chamber 1000 having the flat plate type burner 1300, the ignition bar assembly 1400 may be safely assembled and the leakage of the mixed gas and the exhaust gas may be blocked by preventing the thermal damage of the sealing member.

Meanwhile, referring to FIG. 20, the upper plate 2200 includes a bottom portion 2210 forming a lower surface of the combustion chamber C, a sidewall portion 2220 forming a sidewall of the combustion chamber C, a round portion 2240 including the upper plate flange 2230 on which the burner flange 1330 is seated and configured to connect an upper end of the sidewall portion 2220 and an inner end of the upper plate flange 2230, and a round portion 2250 configured to connect an outer end of the bottom portion 2210 and a lower end of the sidewall portion 2220.

As described above, since the upper plate 2200 includes the round portions 2240 and 2250, the water pressure of the heat medium stored in the water tank B may be dispersed to improve the durability of the upper plate 2000. The ratio of the diameter difference between an outer diameter d1 of the upper plate flange 2230 and an inner diameter d2 of a lower end of the round portion 2240 may be smaller than or equal to 20%. When the upper plate flange 2230 and the round portion 2240 are configured in the ratio of the diameter difference as described above, the flow rate and temperature of water accommodated in the water tank B may be uniformly controlled.

Further, a height h between a lower surface of the flat plate type burner 1300 inserted into the upper plate 2200 and a bottom surface of the upper plate 2200 may be set so that the tip of a flame generated from the flat plate type burner 1300 may be spaced apart from the bottom surface of the upper plate 2200 by a predetermined distance, and the height h may be set to a size of about 80 mm in consideration of the length of the flame from the flat plate type burner 1300. As described above, the tip of the flame is set to be spaced apart from the bottom surface of the upper plate 2200 by the predetermined distance because a condition in which nitrogen oxide (NOx) and carbon monoxide (CO) are experimentally minimized may be secured when a predetermined space between the tip of a flame generated from the flat plate type burner 1300 and the bottom surface of the upper plate 2200 is secured.

Further, as described above, since the height h of the upper plate 2200 is designed to be low, the height of the combustion chamber C becomes low and thus the overall height of the smoke tube boiler 1' may be decreased. That is, when the conventional cylindrical burner is applied, the height between a lower surface of the burner and a bottom surface of the upper plate is about 190 mm, but in the case of the present invention, since the height may be decreased to about 80 mm, the height may accordingly be decreased by about 40% in comparison with the conventional art.

Meanwhile, in the embodiment, the electrode bar assembly 1400 is formed at a location adjacent to one side of the mixed air introduction port 1200 connected to a blower 7000 configured to supply the mixed air to the mix chamber 1000. In this case, since a worker may easily access the electrode bar assembly 1400 through the mixed air introduction port 1200, convenience of maintenance may be improved.

Figure 2:
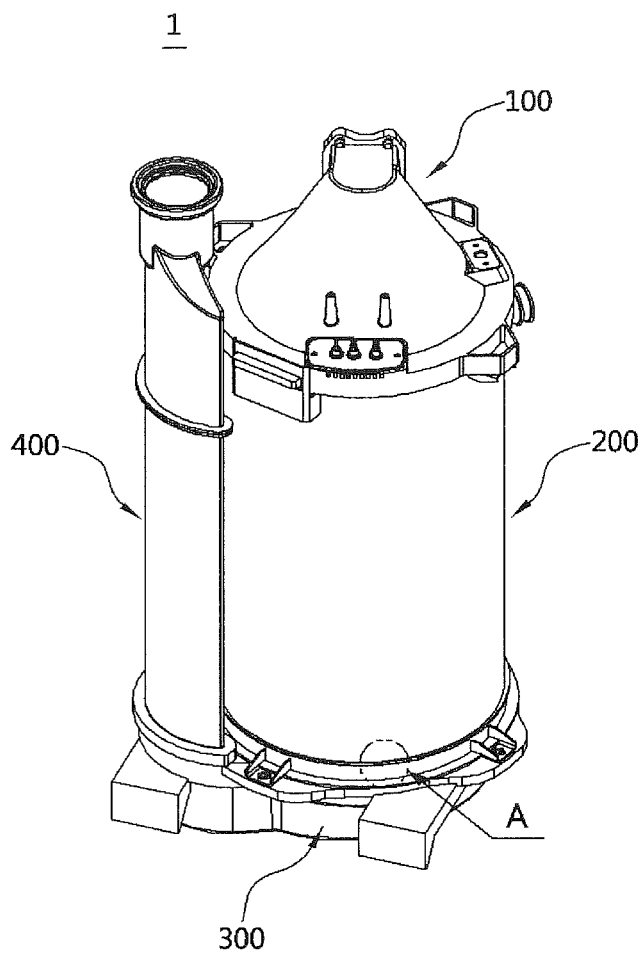
FIG. 2 is a perspective view of an exterior of a smoke tube boiler according to an embodiment of the present invention.
Figure 3:
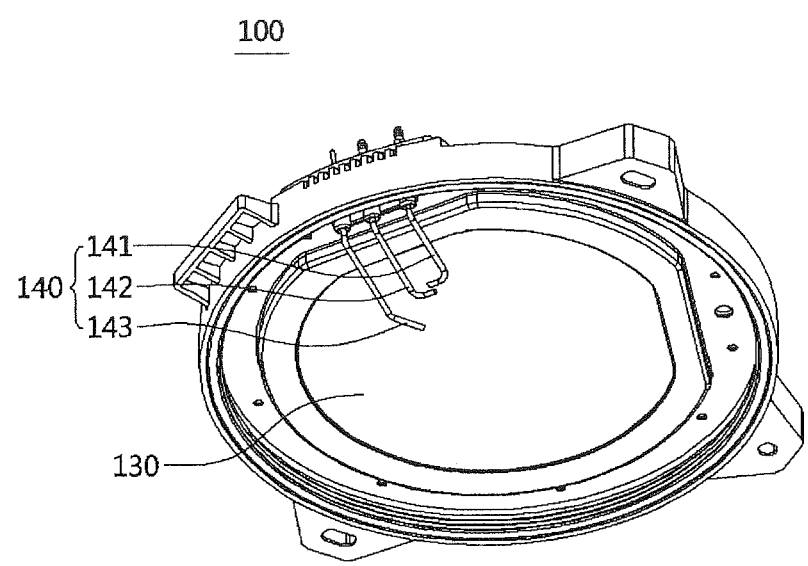
FIG. 3 is a perspective view of a lower surface of a mix chamber shown in FIG. 2.

In another embodiment, as shown in the above-described FIG. 2, the electrode bar assembly 1400 may be disposed at a side opposite to the mixed air introduction port 1200. In this case, since the mixed air supplied from the blower 7000 is directly supplied to the electrode bar assembly 1400, delayed ignition may be prevented.

Referring to FIGS. 21 to 26, the heat exchanger 2000 includes an outer cylinder 2100 having a heat medium introduction port 2110 and a heat medium discharge port 2120 and through which the heat medium is introduced and discharged, an upper plate 2200 coupled to an inner side of the outer cylinder 2100 and forming a combustion chamber C by the flat plate type burner 1300 seated thereon so that a heat medium path is formed between the upper plate 2200 and the outer cylinder 2100, a plurality of tubes 2300 each formed in a flat shape so that the combustion gas generated from the combustion chamber C is heat-exchanged with the heat medium while flows along the insides of the tubes 2300, a tube assembly 10000 having turbulators 2400 and 2500 coupled to inner sides of the tubes 2300 to cause the turbulence in the flow of the combustion gas and configured to support the tubes 2300, and a lower plate 2700 configured to support the tube assembly 10000 and coupled to a condensate collector 3000.

Multilayer diaphragms 2610, 2620, and 2630 are provided on outer side surfaces of the tubes 2300 to be vertically spaced apart from each other to guide the flow of the heat medium so that the flow direction of the heat medium is alternately switched inward and outward in the radial direction, and the multilayer diaphragms 2610, 2620, and 2630 are fixed and supported by a supporter 2640. The plurality of tubes 2300 are installed in a vertical direction so that the combustion gas generated from the combustion chamber C flows in a downward direction, and the plurality of tubes 2300 are spaced apart from each other in a circumferential direction to be disposed in a radial shape.

In the embodiment, the multilayer diaphragms include an upper diaphragm 2610, a middle diaphragm 2620, and a lower diaphragm 2630 each having a plate shape. Referring to FIG. 24A, in the upper diaphragm 2610, a tube insertion port 2610*a* into which the tubes are inserted is formed, and an opening portion 2610*b* through which the heat medium passes is formed at a center. Referring to FIG. 24B, in the middle diaphragm 2620, since a tube insertion port 2620*a* is formed with a gap from outer side surfaces of the tubes 2300, the heat medium flows through the gap between the tube insertion port 2620*a* and the tubes 2300. A center portion 2620*b* of the middle diaphragm 2620 is formed in a blocked structure. In the embodiment, the tube insertion port 2620*a* may be configured in a structure in which the two tubes 2300 are spaced apart from each other toward both sides to be inserted into the tube insertion port 2620*a*. Referring to FIG. 24C, in the lower diaphragm 2630, a tube insertion port 2630*a* having the same structure as that of the upper diaphragm 2610 is formed, and an opening portion 2630*b* is formed at a center.

According to structures of the above-described multilayer diaphragms 2610, 2620, and 2630, as shown by arrows in FIGS. 25 and 26, the heat medium introduced into the outer cylinder 2100 through the heat medium introduction port 2110 flows toward the opening portion 2630b formed at the center of the lower diaphragm 2630 inward in the radial direction, the heat medium which passes through the opening portion 2630b to flow in an upward direction from the lower diaphragm 2630 is dispersed to a separation space of the tube insertion port 2620a formed in a radial shape in the middle diaphragm 2620 to flow outward in the radial direction, and the heat medium which passes through the tube insertion port 2620a to flow in an upward direction from the middle diaphragm 2620 toward the opening portion 2610b formed at the center of the upper diaphragm 2610 inward in the radial direction, and then passes through the opening portion 2610b to be discharged through the heat medium discharge port 2120 formed in one side of an upper portion of the outer cylinder 2100.

As described above, since the flow direction of the heat medium is alternately switched inward and outward in the radial direction, the flow distance of the heat medium increases, and thus the heat-exchange efficiency of the heat exchanger 2000 may be improved, and since a high-efficiency heat exchange performance may be obtained even when the height of the heat exchanger 2000 is decreased in comparison with a conventional heat exchanger, the height of the heat exchanger 2000 may be decreased. Further, the flow velocity of the heat medium may be increased to prevent a boiling phenomenon due to partial overheating caused by stagnation of the heat medium.

Hereinafter, the configuration and operation of the tube assembly 10000 will be described below with reference to FIGS. 27 to 33.

The tube assembly 10000 according to the embodiment of the present invention includes a tube 2300 formed in a flat shape so that the combustion gas generated from a combustion chamber C flows through the inside of the tube 2300 to be heat exchanged with a heat medium which flows through the outside, an upper turbulator 2400 coupled to an inner side of an upper portion of the tube 2300 adjacent to the combustion chamber to come into surface contact with the tube 2300, so as to increase heat conductivity and cause the turbulence in the flow of the combustion gas, and a lower turbulator 2500 coupled to an inner side of the tube 2300 in a downward direction from the upper turbulator 2400 to cause the turbulence in the flow of the combustion gas.

The upper turbulator 2400 includes tube contact surfaces 2410a and 2410b (2410) that come into close contact with inner side surfaces of the tube 2300 and pressure supporting parts 2420a and 2420b (2420) formed to be bent from incised portions 2430a and 2430b (2430) in the tube contact surfaces 2410a and 2410b (2410).

The tube contact surface 2410 includes a structure in which a first tube contact surface 2410a configured to come into surface contact with the inner side surface of one side portion of the tube 2300 and a second tube contact surface 2410b configured to come into surface contact with the inner side surface of the other side portion of the tube 2300 are symmetric.

The pressure supporting part 2420 is a configuration for preventing deformation and damage of the tube 2300 due to the water pressure of the heat medium and includes a first pressure supporting part 2420a in which a part of a first incised portion 2430a of the first tube contact surface 2410a is bent to protrude toward the second tube contact surface 2410b and a second pressure supporting part 2420b in which a part of a second incised portion 2430b of the second tube contact surface 2410b is bent to protrude toward the first tube contact surface 2410a.

The incised area of the first incised portion 2430a is formed to be greater than the incised area of the second incised portion 2430b, a protruding end portion of the first pressure supporting part 2420a comes into contact with the second tube contact surface 2410b, and when the pressure supporting part 2420 is inserted into the tube 2300, a protruding end portion of the second pressure supporting part 2420b is provided to come into contact with the inner side surface of the tube 2300 through the first incised portion 2430a.

According to the above, the first pressure supporting part 2420a supports the first tube contact surface 2410a and the second tube contact surface 2410b to solidly maintain the shapes thereof when the water pressure is provided, and the second pressure supporting part 2420b more solidly supports the tube 2300 supported by the first tube contact surface 2410a and the second tube contact surface 2410b.

Further, as shown in FIG. 33, a plurality of first pressure supporting parts 2420a and a plurality of second pressure supporting parts 2420b are provided to be spaced apart from each other in frontward and backward directions and a vertical direction, a first pressure supporting part 2420a' located at an upper side and a first pressure supporting part 2420a" located at a lower side are provided in the vertical direction at locations not overlapping each other, and a second pressure supporting part 2420b' located at an upper side and a second pressure supporting part 2420b" located at a lower side are provided in the vertical direction at locations not overlapping each other. According to the above, since the water pressure which acts to the tube 2300 due to the first pressure supporting parts 2420a and the second pressure supporting parts 2420b provided in a zigzag shape in the frontward and backward directions and the vertical direction throughout the entire area of the upper turbulator 2400 is uniformly dispersed, deformation and damage of the tube 2300 may be efficiently prevented.

Further, since each of the first pressure supporting part 2420a and the second pressure supporting part 2420b is formed in a plate shape and in a structure in which both side surfaces having broad areas are disposed to be parallel to a flow direction of the combustion gas, as shown by arrows in FIG. 32A, flow resistance may be minimized in a process in which the combustion gas passes through the first pressure supporting parts 2420a and the second pressure supporting parts 2420b while flowing.

Referring to FIG. 29, the lower turbulator 2500 includes a flat surface portion 2510 configured to divide an inner space of the tube 2300 into both sides and disposed in a longitudinal direction of the tube 2300, and a first guide piece 2520 and a second guide piece 2530 spaced apart in a longitudinal direction from both side surfaces of the flat surface portion 2510 and formed to protrude to be alternately inclined.

The first guide piece 2520 is disposed on one side surface of the flat surface portion 2510 to be inclined to one side and the second guide piece 2530 is disposed on the other side surface of the flat surface portion 2510 to be inclined to the other side. Accordingly, the heat media introduced into the first guide piece 2520 and the second guide piece 2530 are sequentially transferred to the second guide piece 2530 and the first guide piece 2520 disposed to be adjacent to the opposite surfaces of the flat surface portion 2510 to alternately flow through both spaces in the flat surface portion 2510.

In a heat medium introduction end of the first guide piece 2520, a first communication port 2520b connected to one side end of the flat surface portion 2510 by the first connection piece 2520a and in which the fluid communicates through both spaces in the flat surface portion 2510 between one side end of the flat surface portion 2510, the first connection piece 2520a, and the first guide piece 2520 is provided.

In a heat medium introduction end of the first guide piece 2530, a second communication port 2530b connected to the other side end of the flat surface portion 2510 by the second connection piece 2530a and in which the fluid communicates through both spaces in the flat surface portion 2510 between the other side end of the flat surface portion 2510, the second connection piece 2530a, and the second guide piece 2530 is provided.

The first guide piece 2520 and the second guide piece 2530 may be configured so that portions of the flat surface portion 2510 may be incised to be bent to both sides of the flat surface portion 2510 and the fluid may communicate through both spaces in the flat surface portion 2510 through the incised portions of the flat surface portion 2510. Further, supporters 2530a and 2530b (2530) configured to protrude in outward directions to come into contact with the facing inner side surfaces of the tube 2300 are formed on both side surfaces of the lower turbulator 2500. In addition, a first supporting part 2550 and a second supporting part 2560 vertically spaced apart from each other to come into contact with both side surfaces of the tube 2300 and protrude in frontward and backward directions are formed on an upper end portion and a lower end portion, respectively, of the lower turbulator 2500.

Meanwhile, referring to FIGS. 34 to 37, the smoke tube boiler 1' includes a condensate collector 3000 in which the condensate generated when vapor which passes through a heat exchanger 2000 and is included in the combustion gas is condensed is collected and drained and a leakage prevention member 3200 coupled to a lower plate 2700 of the heat exchanger 2000 and a connection part of the condensate collector 3000 to prevent leakage of the condensate.

Referring to FIG. 22, the lower plate 2700 is formed in an end plate structure and includes a horizontal portion 2710 having a plurality of tube insertion holes 2710a through which a lower end portion of the tube 2300 passes formed therein to support the lower end portion of the tube 2300 and form the bottom surface of the water tank B, a vertical portion 2720 coupled to a lower end portion of the outer cylinder 2100, and a round portion 2730 configured to connect an outer end of the horizontal portion 2710 and a lower end portion of the vertical portion 2720 and formed in a shape convexly curved toward the outside to disperse the water pressure of the heat medium.

As described above, since the round portion 2730 formed in the shape convexly curved toward the outside is formed on a corner connecting the horizontal portion 2710 and the vertical portion 2720 of the lower plate 2700, the water pressure of the heat medium may be dispersed, and thus durability may be improved by improving the water pressure resistance of the lower plate 2700 to minimize deformation of the lower plate 2700.

Hereinafter, a coupling structure between the condensate collector 3000 and the leakage prevention member 3200 will be described.

Referring to FIGS. 36 and 37, the leakage prevention member 3200 is provided between an edge portion of the lower plate 2700 and an edge portion of the condensate collector 3000 to prevent the leakage of the condensate.

Since a body 3210 of the leakage prevention member 3200 is provided in a shape which surrounds a lower portion of each of the round portion 2730 and the vertical portion 2720 of the lower plate 2700, the condensate CW formed on the horizontal portion 2710 of the lower plate 2700 may be blocked from moving in a lateral direction by a blockage of a bottom portion 2330 formed to extend to one side from a lower portion of the body 3210 and may drop in a downward direction.

Meanwhile, a contact protrusion 3220 configured to protrude toward an outer side surface of the lower plate 2700 may be formed on an inner side surface 3210a of the leakage prevention member 3200. A plurality of contact protrusion 3220a, 3220b, 3220c, 3220d, 3220e, and 3220f may be formed at locations vertically spaced apart from the inner side surface 3210a of the leakage prevention member 3200.

According to configuration of the above-described contact protrusions 3220, when the water pressure acts, the contact protrusions 3220 of the leakage prevention member 3200 configured to protrude in a direction opposite to a direction in which the water pressure acts may come into contact with the outer side surface of the lower plate 2700 to effectively prevent a phenomenon in which the condensate CW is infiltrated into the gap between the lower plate 2700 and the leakage prevention member 3200 to leak. Further, when the plurality of contact protrusions 3220 are formed at locations vertically spaced apart from each other, the leakage of the condensate CW may be more reliably prevented.

A first flange part 3010 configured to support the leakage prevention member 3200 is provided at an edge portion of the condensate collector 3000, and a fastening protrusion 3010a and a fastening groove 3230a fastened to each other at corresponding locations are provided at the leakage prevention member 3200 and the first flange part 3010. Further, the edge portion of the condensate collector 300 further includes an extending portion 3020 configured to extend in an upward direction from an outer end of the first flange part 3010 and come into close contact with an outer side surface of the leakage prevention member 3200, and a second flange part 3030 configured to extend in an outward direction from an end of the extending portion 3020, and a fitting protrusion 3240a and a fitting groove 3240b fitted to each other at corresponding locations are formed on an upper portion of the leakage prevention member 3200 and the second flange part 3030. According to the above, the leakage of the condensate CW may be blocked, and the location of the leakage prevention member 3200 may be solidly fixed.

Meanwhile, referring to FIG. 35, an exhaust guide 3300 in which a plurality of punched holes 3310a and 3310b (3310) are formed so that the combustion gas which passes through the heat exchanger 2000 is uniformly distributed to the entire area of the condensate collector 3000 to be discharged is provided in the condensate collector 3000. The punched holes 3310 may be formed to have different sizes in consideration of the flow direction of the combustion gas.

Further, since a stair part 3040 configured to guide the flow of the combustion gas which passes through the exhaust guide 3300 to the condensate drain port 3100 formed under one side of the condensate collector 3000 may be formed on a bottom surface of the condensate collector 3000, as shown by a dotted line arrow which is the drainage direction of the condensate and a solid line arrow which is the flow direction of the combustion gas in FIG. 37, the drainage direction of the condensate and the flow direction of the combustion gas may be the same in the condensate collector 3000. According to the above configuration, since the condensate is guided in the flow direction of the exhaust gas, corrosion of the lower plate 2700 due to stagnation of the condensate may be prevented and the condensate may be guided to the condensate drain port 3100 to be smoothly drained.

As described above, the present invention is not limited to the above-described embodiments, it will be apparent to those skilled in the art that the present invention may be modified without departing from the spirit of the present invention in the claims, and such a modification is included in the scope of the present invention.

The invention claimed is:

1. A smoke tube boiler comprising:
   a mix chamber disposed on a combustion chamber and having a mixing space in which a combustion gas and air are mixed, and a flat plate type burner;
   an ignition bar assembly configured to pass through one side portion of the mix chamber as assembled and extend in a downward direction from the flat plate type burner across an upper portion of the combustion chamber; and
   a sealing member configured to block leakage of a mixed gas of the mixing space and an exhaust gas of the combustion chamber to the outside through a gap between the mix chamber and the ignition bar assembly,
   wherein:
   a mix chamber flange and a burner flange are provided at the one side portion of the mix chamber to meet each other to seal the mixing space; and
   the ignition bar assembly passes through the mix chamber flange and the burner flange at a location spaced apart from the mixing space as assembled.

2. The smoke tube boiler of claim 1, wherein the sealing member includes a first sealing member provided at a portion in which the mix chamber flange and the burner flange meet each other to prevent leakage of the mixed gas.

3. The smoke tube boiler of claim 2, wherein an insulation material configured to block transfer of combustion heat generated from the combustion chamber is provided on the first sealing member.

4. The smoke tube boiler of claim 2, wherein:
   a coupling plate through which the ignition bar assembly passes to be coupled thereto is provided on the one side portion of the mix chamber; and
   the sealing member includes a second sealing member provided between an upper portion of the one side portion of the mix chamber and the coupling plate to prevent leakage of the exhaust gas.

5. The smoke tube boiler of claim 4, wherein a plurality of contact protrusions formed to protrude to the outside are formed at predetermined intervals on an outer side surface of the second sealing member.

6. The smoke tube boiler of claim 1, wherein:
   the ignition bar assembly includes an ignition bar and a flame sensing bar;
   an ignition bar coupling plate through which the ignition bar passes to be coupled thereto and a flame sensing bar coupling plate through which the flame sensing bar passes to be coupled thereto are provided on the one side portion of the mix chamber; and
   the sealing member are provided between the upper portion of the one side portion of the mix chamber and the ignition bar coupling plate and between the upper portion of the one side portion of the mix chamber and the flame sensing bar coupling plate.

7. The smoke tube boiler of claim 1, comprising:
   an outer cylinder provided at an edge of a tube through which the combustion gas passes the inside thereof to form an outer wall of a water tank in which a heat medium is accommodated at the outside of the tube; and
   a lower plate having an end plate structure formed of a horizontal portion configured to support a lower end portion of the tube and form a bottom surface of the water tank, a vertical portion coupled to an outer side surface of a lower end portion of the outer cylinder, and a round portion configured to connect an outer end of the horizontal portion and a lower end portion of the vertical portion and formed in an outwardly convexly curved shape to disperse a water pressure of the heat medium.

8. The smoke tube boiler of claim 7, wherein the vertical portion of the lower plate is fit-coupled to the outer side surface of the lower end portion of the outer cylinder.

9. The smoke tube boiler of claim 7, wherein:
   a flange part configured to extend in an outward direction by a predetermined length is formed on the vertical portion of the lower plate; and
   the flange part and the outer side surface of the outer cylinder are coupled to each other by welding.

10. The smoke tube boiler of claim 7, comprising:
    a condensate collector provided under the lower plate to collect condensate generated from the lower plate; and
    a leakage prevention member provided between an edge portion of the lower plate and an edge portion of the condensate collector to prevent leakage of the condensate.

11. The smoke tube boiler of claim 10, wherein:
    the leakage prevention member is provided in a shape which surrounds a lower portion of each of the round portion and the vertical portion of the lower plate; and
    the condensate formed on the horizontal portion of the lower plate is blocked from moving in a lateral direction by a blockage of the leakage prevention member and drops in a downward direction.

12. The smoke tube boiler of claim 11, wherein a sidewall of the condensate collector is provided to be located near a boundary between the horizontal portion and the round portion of the lower plate to guide dropping of the condensate.

13. The smoke tube boiler of claim 10, wherein a contact protrusion configured to protrude toward an outer side surface of the lower plate is formed on an inner side surface of the leakage prevention member.

14. The smoke tube boiler of claim 13, wherein a plurality of contact protrusions are formed at locations vertically spaced apart from the inner side surface of the leakage prevention member.

15. The smoke tube boiler of claim 13, wherein:
    a first flange part configured to extend in an outward direction from an upper end of a sidewall of the condensate collector to support a lower portion of the leakage prevention member is provided at the edge portion of the condensate collector; and
    a fastening protrusion and a fastening groove fastened to each other at corresponding locations are provided at the leakage prevention member and the first flange part.

16. The smoke tube boiler of claim 15, further comprising: an extending portion configured to extend in an upward direction from an outer end of the first flange part and come into close contact with an outer side surface of the leakage prevention member; and a second flange part configured to extend in an outward direction from an end of the extending portion at the edge portion of the condensate collector,
   wherein a fitting protrusion and a fitting groove fitted to each other at corresponding locations are formed on an upper portion of the leakage prevention member and the second flange part to block the leakage of the condensate and fix a location of the leakage prevention member.

17. The smoke tube boiler of claim 10, wherein an exhaust guide, having a plurality of punched holes formed therein so that the combustion gas which passes through the heat exchanger is uniformly distributed to the entire area of the condensate collector to be discharged, is provided in the condensate collector.

18. The smoke tube boiler of claim 17, wherein a stair part configured to guide a flow of the combustion gas which passes through the exhaust guide to a drain port of the condensate is formed on a bottom surface of the condensate collector so that a drainage direction of the condensate and a flow direction of the combustion gas are the same in the condensate collector.

19. The smoke tube boiler of claim 1, wherein the mix chamber includes a flat-shaped mix chamber body and the flat plate type burner is disposed on the combustion chamber in a horizontal direction.

20. The smoke tube boiler of claim 19, wherein a separation space between a lower surface of the mix chamber body and an upper surface the flat plate type burner is formed in a flat disc shape.

21. The smoke tube boiler of claim 1, further comprising a heat exchanger in which heat exchange between combustion heat of the combustion chamber and a heat medium is performed,
   wherein the heat exchanger includes an outer cylinder through which the heat medium is introduced and discharged and forming an outer wall of a water tank in which the heat medium is accommodated, an upper plate having an end plate structure coupled to an inner side of the outer cylinder and forming the combustion chamber so that a heat medium path is formed between the upper plate and the outer cylinder, a plurality of tubes each formed in a flat shape so that the combustion gas generated from the combustion chamber exchanges heat with the heat medium which flows through the outside while flowing along the insides of the tubes, a turbulator coupled to inner sides of the tubes to induce generation of turbulence in a flow of the combustion gas, a multilayer diaphragm provided between the outer cylinder and the tube to guide the heat medium so that a flow direction of the heat medium is alternately switched inward and outward in a radial direction, and a lower plate having an end plate structure configured to support lower end portions of the tubes and form a bottom surface of the water tank.

22. The smoke tube boiler of claim 21, wherein:
a flange of the upper plate is formed to protrude from an upper end of a round portion to the outside; and
a ratio of a diameter difference between an outer diameter of the flange of the upper plate and an inner diameter of a lower end of the round portion is smaller than or equal to 20%.

23. The smoke tube boiler of claim 21, wherein a height between a lower surface of the flat plate type burner and a bottom surface of the upper plate is set so that a tip of a flame generated from the flat plate type burner is spaced apart from the bottom surface of the upper plate by a predetermined distance.

24. The smoke tube boiler of claim 21, wherein the turbulator is formed of an upper turbulator coupled to an inner side of an upper portion of the tube adjacent to the combustion chamber to come into surface contact with the tube to increase heat conductivity and induce generation of the turbulence in the flow of the combustion gas, and a lower turbulator coupled to an inner side of the tube in a downward direction from the upper turbulator to induce generation of the turbulence in the flow of the combustion gas.

25. A smoke tube boiler comprising:
a mix chamber disposed on a combustion chamber and having a mixing space in which a combustion gas and air are mixed, and a flat plate type burner;
an ignition bar assembly configured to pass through one side portion of the mix chamber as assembled and extend in a downward direction from the flat plate type burner across an upper portion of the combustion chamber;
a sealing member configured to block leakage of a mixed gas of the mixing space and an exhaust gas of the combustion chamber to the outside through a gap between the mix chamber and the ignition bar assembly; and
a cooling means configured to block transfer of the combustion heat generated from the combustion chamber to the sealing means,
wherein the cooling means includes an air cooling type cooling means and a water cooling type cooling means.

26. The smoke tube boiler of claim 25, wherein:
a mix chamber flange and a burner flange are provided at the one side portion of the mix chamber to meet each other to seal the mixing space;
the ignition bar assembly passes through the mix chamber flange and the burner flange as assembled; and
the mix chamber flange and the burner flange are cooled by the mixed gas introduced into the mixing space in the air cooling type cooling means.

27. The smoke tube boiler of claim 25, wherein:
a mix chamber flange and a burner flange are provided at the one side portion of the mix chamber to meet each other to seal the mixing space;
the ignition bar assembly passes through the mix chamber flange and the burner flange as assembled; and
an upper plate flange configured to come into contact with a heat medium of a heat exchanger provided under the combustion chamber is provided to come into contact with the burner flange to cool the burner flange in the water cooling type cooling means.

28. The smoke tube boiler of claim 25, wherein a plurality of radiating fins are provided on the one side portion of the mix chamber at which the ignition bar assembly is assembled along an edge of the ignition bar assembly.

* * * * *